United States Patent
Kadir et al.

(10) Patent No.: US 10,577,444 B2
(45) Date of Patent: Mar. 3, 2020

(54) PROCESS FOR PREPARING SURFACTANT RESPONSIVE EMULSION POLYMERS

(71) Applicant: Lubrizol Advanced Materials, Inc., Cleveland, OH (US)

(72) Inventors: Murat Kadir, Brecksville, OH (US); Shui-Jen Raymond Hsu, Westlake, OH (US); Krishnan Chari, Hudson, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 315 days.

(21) Appl. No.: 14/771,871

(22) PCT Filed: Mar. 5, 2014

(86) PCT No.: PCT/US2014/020497
§ 371 (c)(1),
(2) Date: Sep. 1, 2015

(87) PCT Pub. No.: WO2014/164092
PCT Pub. Date: Oct. 9, 2014

(65) Prior Publication Data
US 2016/0017070 A1    Jan. 21, 2016

Related U.S. Application Data

(60) Provisional application No. 61/776,055, filed on Mar. 11, 2013.

(51) Int. Cl.
*C08F 218/08* (2006.01)
*C08J 3/05* (2006.01)
*C08F 216/12* (2006.01)

(52) U.S. Cl.
CPC ............ *C08F 218/08* (2013.01); *C08J 3/05* (2013.01); *C08F 216/125* (2013.01); *C08J 2331/04* (2013.01)

(58) Field of Classification Search
CPC ....... C08F 218/08; C08F 216/125; C08J 3/05; C08J 2331/04
USPC ........................................................ 524/446
See application file for complete search history.

(56) References Cited

U.S. PATENT DOCUMENTS

| | | | |
|---|---|---|---|
| 5,385,971 A | 1/1995 | Sauer | |
| 5,773,541 A * | 6/1998 | Boeckh | C08F 218/08 526/209 |
| 7,378,479 B2 * | 5/2008 | Tamareselvy | A61K 8/8158 526/303.1 |
| 8,258,233 B2 | 9/2012 | Moeller et al. | |
| 9,096,755 B2 | 8/2015 | Chari | |
| 2014/0341957 A1 * | 11/2014 | Yang | C09K 8/035 424/401 |
| 2014/0348887 A1 | 11/2014 | Hsu | |

FOREIGN PATENT DOCUMENTS

| | | |
|---|---|---|
| JP | 6-16752 A | 1/1994 |
| WO | 97/31041 A1 | 8/1997 |

\* cited by examiner

*Primary Examiner* — Ling Siu Choi
*Assistant Examiner* — Ronald Grinsted
(74) *Attorney, Agent, or Firm* — Thoburn Dunlap

(57) ABSTRACT

A process for preparing a vinyl acetate rich polymer for formulating surfactant containing compositions comprising at least one anionic surfactant and having yield stress properties without a significant increase in viscosity, low turbidity, and the ability to suspend insoluble materials in the form of particulates and/or droplets that require suspension or stabilization is disclosed.

35 Claims, No Drawings

PROCESS FOR PREPARING SURFACTANT RESPONSIVE EMULSION POLYMERS

CROSS REFERENCE TO RELATED APPLICATION

This application claims priority from PCT Application Ser. No. PCT/US2014/020497 filed on Mar. 5, 2014, which claims the benefit of U.S. Provisional Application No. 61/766,055 filed on Mar. 11, 2013.

FIELD OF THE INVENTION

Embodiments of the invention relate to rheology modifying polymers and more specifically to a redox process for preparing a vinyl acetate rich emulsion polymer having yield stress properties. Additionally, embodiments of the invention also relate to the formation of a rheologically and phase stable surfactant responsive yield stress composition comprising the vinyl acetate rich emulsion polymer that can be used over a broad pH range to suspend particulates and insoluble materials.

BACKGROUND OF THE INVENTION

We are surrounded in everyday life by yield stress fluids. Simply stated, yield stress fluids remain stationary until a sufficient stress is placed on the fluid at which point the fluid will flow. It can be thought of as the initial resistance to flow under stress and is also referred to as yield value. Yield stress is a measurable quantity similar to, but not dependent on viscosity. While a certain rheology modifier may thicken or enhance the viscosity of a composition in which it is included, it does not necessarily have desirable yield stress properties.

A desirable yield stress property is critical to achieving certain physical and aesthetic characteristics in a liquid medium, such as the indefinite suspension of particles, insoluble liquid droplets, or the stabilization of gas bubbles within a liquid medium. Particles dispersed in a liquid medium will remain suspended if the yield stress (yield value) of the medium is sufficient to overcome the effect of gravity or buoyancy on those particles. Insoluble liquid droplets can be prevented from rising and coalescing and gas bubbles can be suspended and uniformly distributed in a liquid medium using yield value as a formulating tool. An example of a yield stress fluid is a micro-gel rheology modifier which is generally used to adjust or modify the rheological properties of aqueous compositions. Such properties include, without limitation, viscosity, flow rate, stability to viscosity change over time, and the ability to suspend particles for indefinite periods of time. They are useful in a number of consumer and industrial applications. An important consumer application includes their use in the formulation of personal care products such as body washes, skin creams, toothpastes, shampoos, hair gels and other cosmetics. In industrial applications, they are useful as subterranean treatment fluids in the oil and gas industry as a component in drilling and fracturing fluids. Typically, they comprise chemically crosslinked polymers having a pH-responsive functionality that is either base or acid sensitive. The polymers may be mixed with other ingredients in a formulation and then neutralized by the addition of a neutralization agent such as an acid or a base. Acid sensitive thickeners are activated upon contact with an acidic agent, while base-sensitive thickeners are activated upon contact with an alkaline agent. Upon neutralization, the polymers swell significantly to form a randomly close-packed (RCP) jammed network of swollen cross-linked micro-gel particles imparting a desired rheological profile, i.e., yield stress, elastic modulus, and viscosity, as well as optical clarity to the formulation.

These types of rheology modifiers are well known in the art. For example, U.S. Pat. Nos. 2,798,053; 2,858,281; 3,032,538; and 4,758,641 describe cross-linked carboxylic acid polymers based on acrylic acid, maleic acid, itaconic acid or methacrylic acid monomers. U.S. Pat. No. 6,635,702 describes crosslinked alkali-swellable acrylate copolymers comprising one or more carboxylic acid monomers and one or more non-acid vinyl monomers. U.S. Pat. No. 7,378,479 discloses a crosslinked acid-swellable polymer containing at least one basic amino substituent that is cationic at low pH, at least one hydrophobically modified polyoxyalkylene substituent derived from an associative vinyl monomer, and at least one polyoxyalkylene substituent derived from a semi-hydrophobic vinyl surfactant monomer. A key feature of these pH-responsive micro-gels is the very large increase in diameter (or size) of individual cross-linked polymer particles upon neutralization. The high swelling efficiency allows formulators to achieve the desired yield stress and viscosity using relatively small amounts of polymer resulting in low cost-in-use. Dalmont, Pinprayoon and Saunders (*Langmuir* vol. 24, page 2834, 2008) show that individual particles in a micro-gel dispersion of a copolymer of ethyl acrylate, and methacrylic acid cross-linked with butanediol diacrylate increase in diameter by at least a factor of 3 upon pH-activation or neutralization. The level of swelling causes an increase in volume fraction of at least 27 ($3^3$). A jammed network is achieved upon neutralization (or activation) with a relatively low concentration of polymer (less than 3 wt. %).

Although pH-responsive micro-gels provide yield stress fluids with the high efficiency that is desired by the formulator, they suffer from a major disadvantage. Rheological properties are not uniform across a broad range in pH and show sharp changes as a function of pH. To overcome these difficulties, various non-ionic thickeners have been proposed. U.S. Pat. No. 4,722,962 describes non-ionic associative thickeners comprising a water-soluble monoethylenically unsaturated monomer and a non-ionic urethane monomer. These polymers provide increases in viscosity or thickening of aqueous formulations that is relatively independent of pH but the polymers are not cross-linked and the purely associative interactions do not create a yield stress.

In addition to pH-responsive micro-gels, temperature-responsive micro-gels are known in the art. Senff and Richtering (*Journal of Chemical Physics*, vol. 111, page 1705, 1999) describe the change in size of non-ionic chemically cross-linked poly (N-isopropylacrylamide) (PNIPAM) micro-gel particles as a function of temperature. The particles swell by almost a factor of 2.5 in diameter (15 times in terms of volume fraction) when the temperature is reduced from 35° C. to 10° C. Although this represents a significant degree of swelling, the use of temperature to activate micro-gels is undesirable. A method of activation is needed that enables switching from a free-flowing suspension to a jammed yield stress fluid under ambient conditions.

Wu and Zhou (*Journal of Polymer Science*: Part B: Polymer Physics, vol. 34, page 1597, 1996) describe the effect of surfactant on swelling of chemically cross-linked PNIPAM homo-polymer micro-gel particles in water. The use of surfactants to activate micro-gels is attractive because many formulations contain surfactants as co-ingredients. However, the efficiency of swelling reported by Wu and Zhou is extremely low. The anionic surfactant sodium dodecyl (lauryl) sulfate increases the size of cross-linked PNIPAM particles by only a factor of 1.4 at room temperature. Furthermore, Wu and Zhou do not teach how to create a shear thinning yield stress fluid with high optical clarity.

Hidi, Napper and Sangster (*Macromolecules*, vol. 28, page 6042, 1995) describe the effect of surfactant on swelling of poly (vinyl acetate) homopolymer micro-gels in water. For micro-gels that are not cross-linked they report an increase in diameter by a factor of 3 to 4 corresponding to a 30 to 60 fold change in volume of the original particles in the presence of sodium dodecyl (lauryl) sulfate. However, swelling is drastically reduced for cross-linked particles. In this case, they observe an increase in diameter by only a factor of 1.4. Once again, Hidi, Napper and Sangster do not teach how to create a shear thinning yield stress fluid with high optical clarity.

Personal care compositions which can suspend particles and/or other water insoluble materials are very desirable. These materials impart or contribute to a variety of user benefits including but not limited to exfoliation, visual aesthetics, and/or the encapsulation and release of beneficial agents upon use. The suspension of particulate and insoluble materials as active and aesthetic agents in personal care compositions is becoming increasingly popular with formulators. Typically, particles are suspended in personal care compositions using structuring systems such as acrylate polymers, structuring gums (e.g., xanthan gum), starch, agar, hydroxyl alkyl cellulose, etc. However, the addition of beads or particles to personal care compositions tends to be problematic. For example, one problem is that particles or insoluble materials very frequently tend to be of a different density than the continuous phase of the composition to which they are added. This mismatch in the density can lead to separation of the particles from the continuous phase and a lack of overall product stability. In one aspect, when added particles are less dense than that of the composition continuous phase, the particles tend to rise to the top of such phase ("creaming"). In another aspect, when the added particles have a density greater than that of the continuous phase, the particles tend to gravitate to the bottom of such phase ("settling"). When large particles are desired to be suspended (e.g., polyethylene particles, guar beads, etc.), the level of polymer used is typically increased to provide increased structure for suspended beads. A consequence of thickening a liquid to provide structure for suspended beads causes a significant increase in liquid viscosity and a corresponding decrease in pourability, a property which is not always desirable. Highly viscous products are typically difficult to apply and rinse away, especially if the shear thinning profile of the viscosity building agent is deficient. High viscosities can also adversely affect packaging, dispensing, dissolution, and the foaming and sensory properties of the product. Moreover, conventionally structured liquids are often opaque or turbid thereby obscuring the suspended beads from the consumer, which adversely affects the aesthetic appeal of the product.

Many common thickeners such as xanthan gum, carboxymethylcellulose (CMC), carrageenan, and acrylic acid homopolymers and copolymers are anionic and therefore, can react with the cationic surfactants and cause precipitation of the cationic and thickener or reduce the efficacy of the cationic surfactant. Non-ionic thickeners such as hydroxyethylcellulose (HEC) and hydroxypropylmethylcellulose (HPMC) can provide viscosity in cationic systems, however, very little suspension properties are imparted to the fluid. Cationic thickeners such as Polyquaternium-10 (cationically modified HEC) and cationic guar provide thickening in cationic systems but not suspension. Some acrylic polymers are effective at thickening cationic systems but they can be limited by pH, require high concentrations, have high cost-in-use, and often have narrow limits of compatibility with the cationic materials.

Anionic surfactants are often used as detersive agents in cleansers and cleaning products because of their excellent cleaning and foaming properties. Exemplary anionic surfactants traditionally utilized in these formulations include, for example, alkyl sulfates and alkyl benzene sulfonates. While the anionic surfactants and, in particular, the anionic sulfates and sulfonates are efficient detersive agents, they are severe ocular irritants and capable of causing mild to moderate dermal irritation to some sensitized persons. Accordingly, it has become increasingly important to consumers that aqueous cleansing compositions be mild in that they do not irritate the eyes and skin when in use. Manufacturers are striving to provide mild cleansing products that also incorporate insoluble benefit and/or aesthetic agents that require stable suspension. It is known that the irritation caused by anionic sulfates and sulfonates can be reduced by utilizing the ethoxylated forms thereof. While ethoxylated surfactants may mitigate ocular and skin irritation in compositions in which they are included, a major problem in using these surfactants is that it is difficult to obtain desirable yield stress properties in an ethoxylated system.

U.S. Pat. No. 5,139,770 describes the use of crosslinked homopolymers of vinyl pyrrolidone in surfactant containing formulations such as conditioning shampoo to obtain relatively high viscosities. However, the patent does not teach how to create a yield stress fluid with high optical clarity that is also shear thinning.

U.S. Pat. No. 5,663,258 describes the preparation of crosslinked copolymers of vinyl pyrrolidone/vinyl acetate. High viscosities are obtained when the polymer is combined with water but there is no teaching about using the polymer to create a yield stress fluid that is activated by surfactant.

U.S. Pat. No. 6,645,476 discloses a water soluble polymer prepared from the free radical polymerization of a hydrophobically modified ethoxylated macromer in combination with a copolymerizable second monomer selected from unsaturated acids and their salts and/or a myriad of other monomers including N-vinyl lactams and vinyl acetate. Preferred polymers are crosslinked and are polymerized from hydrophobically modified ethoxylated macromers in combination with neutralized acrylamidolmethylpropane-sulfonic acid. The viscosities of 1% aqueous solutions of the polymer preferably range from 20,000 mPa·s to 100,000 mPa·s. There is no teaching of a surfactant activated polymer devoid of hydrophobically modified ethoxylated macromer repeating units providing a yield stress fluid exhibiting good suspension properties without a substantial increase in viscosity.

U.S. Pat. No. 4,609,704 discloses a vinyl acetate/butyl acrylate copolymer binder emulsion for a paper coating composition that exhibits wet pick strength. The copolymer is prepared by an aqueous emulsion polymerization process in the presence of a specific stabilizing system and a redox free radical initiator system. The oxidizing agents include hydrogen peroxide, organic peroxides, such as t-butyl hydroperoxide, persulfates, such as ammonium or potassium persulfate, and the like.

U.S. Pat. No. 5,540,987, describes an improved process for preparing vinyl acetate based emulsion polymers comprising emulsion polymerizing vinyl acetate, a crosslinking monomer and optional comonomers using a redox initiator system including an oxidant selected from hydrophobic hydroperoxides (t-butyl hydroperoxide, t-amyl hydroperoxide, and cumene hydroperoxide) and a reducing agent selected form ascorbic acid. The crosslinkers are selected from N-methylol (meth)acrylamide, N-methylol allyl carbamate, iso-butoxy methyl acrylamide, and n-butoxy methyl acrylamide. The emulsion polymerized vinyl acetate polymers are useful as binders in textile applications. In U.S. Pat. Nos. 4,609,704 and 5,540,987 there is no teaching of a surfactant activated yield stress polymer providing good suspension properties in surfactant containing compositions.

U.S. Pat. No. 6,143,817 teaches that emulsion polymers can be prepared by polymerizing ethylenically unsaturated monomers in aqueous medium, initiated by a free radical initiating agent, in the presence of polyamino acid heteropolymer emulsifying and stabilizing agents. Suitable polymerizable ethylenically unsaturated monomers include vinyl ester monomers such as vinyl acetate. Other polymerizable ethylenically unsaturated monomers include alkyl (meth) acrylate monomers, monoethylenically unsaturated carboxylic acid monomers, styrene, butadiene, acrylonitrile, acrylamide, n-methylolacrylamide, di-butyl maleate, ethylene, and vinyl chloride. The emulsion polymerization can be initiated by a myriad of thermal and redox initiator systems. Suitable free radical polymerization initiating agents include those well-known in the art including, peroxides, hydroperoxides, persulfates, and azo initiators such as hydrogen peroxide, benzoyl peroxide, t-butyl hydroperoxide, cumene peroxide, t-butyl perbenzoate, t-butyl diperphthalate, methyl ethyl ketone peroxide, ammonium persulfate, sodium persulfate, potassium persulfate, azodusobutyronitrile, and mixtures thereof, as well as cerium, manganese, and vanadium catalyzed systems and also other systems such as those catalyzed by irradiation. If redox conditions are employed, a reducing agent such as sodium sulphoxylate formaldehyde, isoascorbic acid, or sodium bisulfite, is utilized to promote decomposition of the free radical initiating agent. The initiating agent may also be an irradiation source suitable for initiation of free radical polymerization.

There are a large number of independent variables that can be manipulated in designing aqueous emulsion polymers. This renders the preparation of improved aqueous emulsion polymers technically challenging. For example, it has been found that certain redox initiators and certain crosslinking monomers disadvantageously effect the formation of vinyl acetate rich polymers with desired yield stress properties. Accordingly, it remains a task to not only deliver a yield stress polymer that demonstrates the ability to effectively suspend particles within a stable surfactant containing composition, but also a need to provide an efficient emulsion polymerization process to obtain such polymers.

SUMMARY OF THE INVENTION

Embodiments of the invention relate to an aqueous emulsion polymer and a method for preparing an aqueous emulsion polymer which possesses yield stress properties.

In one aspect, embodiments of the invention relate to a crosslinked, nonionic, vinyl acetate rich polymer that can be swollen in the presence of a surfactant composition to impart a yield stress property to that composition. In another aspect, an embodiment of the invention relates to a yield stress composition comprising a crosslinked, nonionic, vinyl acetate rich polymer and a surfactant.

In still another aspect, an embodiment of the invention relates to a thickened aqueous composition comprising a crosslinked, nonionic, vinyl acetate polymer and at least one surfactant, wherein the concentration of the polymer is no more than 5 wt. % based on the total weight of the composition, and the at least one surfactant is no more than 30 wt. % of the composition, the yield stress of the composition is at least 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14.

In still another aspect, an embodiment of the invention relates to a thickened aqueous composition comprising a crosslinked, nonionic, vinyl acetate rich polymer and at least one surfactant, wherein the concentration of the polymer is no more than 5 wt. % based on the total weight of the composition, and the at least one surfactant is no more than 30 wt. % of the composition, wherein the ratio of the standard deviation to the mean of measured values for yield stress, elastic modulus and optical clarity is less than 0.3 in one aspect, and less than 0.2 in another aspect in the pH range from about 2 to about 14.

In still another aspect, an embodiment of the invention relates to a thickened aqueous composition comprising a crosslinked, nonionic, vinyl acetate polymer and at least one surfactant, wherein the concentration of the polymer is no more than 5 wt. % based on the total weight of the composition, and at least one surfactant is no more than 30 wt. % of the composition, the yield stress of the composition is at least 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14 and wherein the composition is able to suspend beads of a size between 0.5 and 1.5 mm wherein the difference in specific gravity of the beads relative to water is in the range of 0.2 to 0.5 for a period of at least 4 weeks at room temperature.

In still another aspect, an embodiment of the invention relates to a thickened aqueous composition comprising a crosslinked, nonionic, vinyl acetate rich polymer and one or more surfactants, wherein the concentration of the polymer is no more than 5 wt. % based on the total weight of the composition, wherein the total concentration of surfactant is no more than 30 wt. % of the composition, the yield stress of the composition is at least 0.1 Pa with a shear thinning index of less than 0.5 at shear rates between about 0.1 and about 1 reciprocal seconds, and wherein the yield stress, elastic modulus and optical clarity of the composition are substantially independent of pH in the range of about 2 to about 14 and wherein the composition is able to suspend beads of a size between 0.5 and 1.5 mm where the difference in specific gravity of the beads relative to water is in the range of 0.2 to 0.5 for a period of at least 4 weeks at room temperature and wherein one of the surfactants contains ethylene oxide moieties and said surfactant is more than 75% by weight of the total surfactant.

The crosslinked, nonionic, vinyl acetate rich polymer and a method for its preparation, as well as the thickened aqueous fluid comprising the polymer and the at least one surfactant may suitably comprise, consist of, or consist essentially of the components, elements, and process delineations described herein. The invention illustratively disclosed herein suitably may be practiced in the absence of any element which is not specifically disclosed herein.

Unless otherwise stated, all percentages, parts, and ratios expressed herein are based upon the total weight of the components contained in the compositions of the present invention.

As used herein, the term "vinyl acetate rich" means that the polymeric material is prepared from a polymerizable monomer composition comprising at least 65 wt. % vinyl acetate based on the total weight of monomers present in the polymerizable monomer composition. As is common in the polymer art, polymers may be described in terms of their constituent monomers without using language such as "repeating units derived from" those monomers. Thus a polymer derived from vinyl acetate may be described as a vinyl acetate polymer even though once polymerized, the polymer will not contain vinyl acetate monomer.

By "nonionic" is meant that a monomer, monomer composition or a polymer polymerized from a monomer composition is devoid of ionic or ionizable moieties ("nonionizable").

An ionizable moiety is any group that can be made ionic by neutralization with an acid or a base.

An ionic or an ionized moiety is any moiety that has been neutralized by an acid or a base.

By "substantially nonionic" is meant that the monomer, monomer composition or polymer polymerized from a monomer composition contains less than 5 wt. % in one aspect, less than 3 wt. % in another aspect, less than 1 wt. % in a further aspect, less than 0.5 wt. % in a still further aspect, less than 0.1 wt. % in an additional aspect, and less than 0.05 wt. % in a further aspect, of an ionizable and/or an ionized moiety.

For the purpose of the specification the prefix "(meth)acryl" includes "acryl" as well as "methacryl". For example, the term "(meth)acrylamide" includes both acrylamide and methacrylamide.

DESCRIPTION OF EXEMPLARY EMBODIMENTS

Exemplary embodiments in accordance with the present invention will be described. Various modifications, adaptations or variations of the exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

While overlapping weight ranges for the various components and ingredients that can be contained in the compositions of the invention have been expressed for selected embodiments and aspects of the invention, it should be readily apparent that the specific amount of each component in the disclosed compositions will be selected from its disclosed range such that the amount of each component is adjusted such that the sum of all components in the composition will total 100 weight percent. The amounts employed will vary with the purpose and character of the desired product and can be readily determined by one skilled in the art.

It has been surprisingly found that highly efficient yield stress fluids with excellent shear thinning and optical clarity over a broad pH range are obtained if certain chemically crosslinked, nonionic, vinyl acetate rich polymers are mixed with surfactants in water. It has been determined that emulsion polymerizing a vinyl acetate rich monomer composition with a specific redox initiator system in the presence of a crosslinking monomer selected from at least one polyalkenyl polyether having at least two polymerizable ethylenically unsaturated double bonds provides the right balance between mechanical rigidity of the particles and expansion in aqueous surfactant media to provide an efficient yield stress polymer. The crosslinked, nonionic, vinyl acetate polymers of the invention display high surfactant activated swelling in water with increases in particle diameter of at least a factor of 2.5 in one aspect and at least 2.7 in another aspect. Furthermore, swollen micro-gels based on the polymers of the invention interact with each other in aqueous surfactant media to create soft glassy materials (SGMs) with high yield stress and shear thinning flow that is substantially independent of pH.

Vinyl Acetate Rich Polymer

The crosslinked, nonionic, vinyl acetate rich polymers useful in the practice of the invention are emulsion polymerized from monomer components that contain free radical polymerizable unsaturation. In one embodiment, the crosslinked, nonionic, vinyl acetate rich polymers useful in the practice of the invention are polymerized from a monomer composition comprising at least 65 wt. % vinyl acetate and hydrophobic monomer, and a crosslinking monomer selected from at least one polyalkenyl polyether having at least two polymerizable ethylenically unsaturated double bonds. The polymer can be emulsion polymerized from a monomer composition comprising 65 to 100 wt. % vinyl acetate in one aspect, from 70 to 95 wt. % in another aspect, and from 75 to about 90 wt. % in a further aspect, based on the weight of total monomers in the polymerizable monomer composition.

In one aspect, the vinyl acetate monomer can be copolymerized via emulsion polymerization techniques with at least one free radically copolymerizable comonomer set forth below. Exemplary comonomers include, but are not limited to:
  i) at least one $C_1$-$C_{22}$ alkyl (meth)acrylate;
  ii) at least one N-vinyl amide;
  iii) at least one vinyl ester (other than vinyl acetate) of an aliphatic carboxylic acid containing an acyl moiety having 2 to 22 carbon atoms;
  iv) at least one amino($C_1$-$C_5$)alkyl (meth)acrylate, at least one hydroxy($C_1$-$C_5$)alkyl (meth)acrylate, and combinations thereof;
  v) at least one alkoxylated associative monomer;
  vi) at least one alkoxylated semi-hydrophobic monomer; and
  vii) mixtures of monomers i), ii), iii), iv), v), and vi).

In one aspect, the copolymerizable comonomer(s) is present in the polymerizable monomer composition in an amount ranging from about 0 or 1 to about 35 wt. % in one aspect, from about 3 to about 30 wt. % in another aspect, from about 5 to about 20 wt. % in still another aspect, and from about 10 to about 15 wt. % in a further aspect, based on the weight percentage of total monomers in the polymerizable monomer composition.

Copolymerizable Monomers

Monomer i) is an alkyl ester of (meth)acrylic acid having an alkyl group containing 1 to 22 carbon atoms. In one aspect, monomer i) can be represented by the following formula:

(I)

wherein R is hydrogen or methyl and $R^1$ is $C_1$ to $C_{22}$ alkyl group in one aspect, and a $C_1$ to $C_5$ alkyl group in another aspect.

Representative monomers under formula i) include, but are not limited to, methyl (meth)acrylate, ethyl (meth) acrylate, butyl (meth)acrylate, sec-butyl (meth)acrylate, isobutyl (meth)acrylate, hexyl (meth)acrylate), heptyl (meth) acrylate, octyl (meth)acrylate, 2-ethylhexyl (meth)acrylate, decyl (meth)acrylate, isodecyl (meth)acrylate, lauryl (meth) acrylate, tetradecyl (meth)acrylate, hexadecyl (meth)acrylate, stearyl (meth)acrylate, behenyl (meth)acrylate, and mixtures thereof.

Monomer ii) is a N-vinyl amide including open chain and cyclic N-vinyl amides (N-vinyl lactams containing 4 to 9 atoms in the lactam ring moiety), wherein the ring carbon atoms optionally can be substituted by one or more lower alkyl groups such as methyl, ethyl or propyl); amino($C_1$-$C_5$)alkyl (meth)acrylates; hydroxy($C_1$-$C_5$)alkyl (meth)acrylates; amino group containing vinyl monomers selected from (meth)acrylamide, N—($C_1$-$C_5$)alkyl(meth)acrylamides, N, N-di($C_1$-$C_5$)alkyl(meth)acrylamides, N—($C_1$-$C_5$)alkylamino($C_1$-$C_5$)alkyl(meth)acrylamides and N,N-di($C_1$-$C_5$)alkylamino($C_1$-$C_5$)alkyl(meth)acrylamides, wherein the alkyl moieties on the disubstituted amino groups can be the same or different, and wherein the alkyl moieties on the monosubstituted and disubstituted amino groups can be optionally substituted with a hydroxyl group; other monomers include vinyl alcohol; vinyl imidazole; and (meth)acrylonitrile. Mixtures of the foregoing monomers also can be utilized.

Representative open chain N-vinylamides include N-vinylformamide, N-methyl-N-vinylformamide, N-(hydroxymethyl)-N-vinylformamide, N-vinylacetamide, N-vinylmethylacetamide, N-(hydroxymethyl)-N-vinylacetamide, and mixtures thereof. Additionally, monomers containing a pendant N-vinyl lactam moiety can also be employed, e.g., N-vinyl-2-ethyl-2-pyrrolidone (meth)acrylate.

Representative cyclic N-vinylamides (also known as N-vinyl lactams) include N-vinyl-2-pyrrolidinone, N-(1-methyl vinyl) pyrrolidinone, N-vinyl-2-piperidone, N-vinyl-2-caprolactam, N-vinyl-5-methyl pyrrolidinone, N-vinyl-3,3-dimethyl pyrrolidinone, N-vinyl-5-ethyl pyrrolidinone and N-vinyl-6-methyl piperidone, and mixtures thereof.

Monomer iii) is a vinyl ester (other than vinyl acetate) of an aliphatic carboxylic acid containing an acyl moiety having 3 to 22 carbon atoms. In one aspect, the vinyl esters can be represented by the formula:

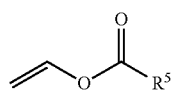

(II)

wherein $R^5$ is a $C_2$ to $C_{21}$ aliphatic group which can be an alkyl or alkenyl. Formula (II) contains an acyl moiety containing 3 to 22 carbon atoms. Representative monomers under formula (II) include but are not limited to vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neo-decanoate, vinyl decanoate, vinyl versatate, vinyl laurate, vinyl palmitate, vinyl stearate, and mixtures thereof.

Monomer iv) is an amino($C_1$-$C_5$)alkyl (meth)acrylate and/or a hydroxy($C_1$-$C_5$)alkyl (meth)acrylate represented by the formula:

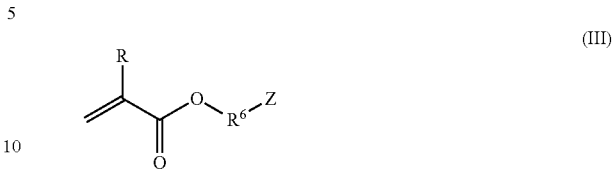

(III)

wherein R is hydrogen or methyl, $R^6$ is an divalent alkylene moiety containing 1 to 5 carbon atoms, and Z is —$NH_2$ or —OH, wherein the alkylene moiety optionally can be substituted by one or more methyl groups. Representative monomers include 2-aminoethyl(meth)acrylate, 2-hydroxyethyl(meth)acrylate, 3-hydroxypropyl(meth)acrylate, 4-hydroxybutyl(meth)acrylate, and mixtures thereof.

Monomer v) is an alkoxylated associative monomer having an ethylenically unsaturated end group portion (i) for addition polymerization with the other monomers of the invention; a polyoxyalkylene mid-section portion (ii) for imparting selective hydrophilic and/or hydrophobic properties to the product polymer, and a hydrophobic end group portion (iii) for providing selective hydrophobic properties to the polymer.

The portion (i) supplying the ethylenically unsaturated end group can be a residue derived from an α,β-ethylenically unsaturated monocarboxylic acid. Alternatively, portion (i) of the associative monomer can be a residue derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product, such as disclosed in U.S. Pat. No. 5,011,978; the relevant disclosures of each are incorporated herein by reference.

The mid-section portion (ii) is a polyoxyalkylene segment of about 2 to about 150 in one aspect, from about 10 to about 120 in another aspect, and from about 15 to about 60 in a further aspect, of repeating $C_2$-$C_4$ alkylene oxide units. The mid-section portion (ii) includes polyoxyethylene, polyoxypropylene, and polyoxybutylene segments, and combinations thereof comprising from about 2 to about 150 in one aspect, from about 5 to about 120 in another aspect, from about 10 to about 60 in a further aspect, and from about 15 to about 30 in a still further aspect, of ethylene, propylene and/or butylene oxide units, arranged in random or block sequences of ethylene oxide, propylene oxide and/or butylene oxide units.

The hydrophobic end group portion (iii) of the associative monomer is a hydrocarbon moiety belonging to one of the following hydrocarbon classes: a $C_8$-$C_{30}$ linear alkyl, a $C_8$-$C_{30}$ branched alkyl, a $C_2$-$C_{30}$ alkyl-substituted phenyl, aryl-substituted $C_2$-$C_{30}$ alkyl groups, a $C_7$-$C_{30}$ saturated or unsaturated carbocyclic alkyl group. The saturated or unsaturated carbocyclic moiety can be a $C_1$-$C_5$ alkyl substituted or unsubstituted monocyclic or bicyclic moiety. In one aspect, the bicyclic moiety is selected from bicycloheptyl or bicycloheptenyl. In another aspect, the bicycloheptenyl moiety is disubstituted with the alkyl substituent(s). In a further aspect, the bicycloheptenyl moiety is disubstituted with methyl on the same carbon atom.

Non-limiting examples of suitable hydrophobic end group portions (iii) of the associative monomers are linear or branched alkyl groups having about 8 to about 30 carbon atoms, such as capryl ($C_8$), iso-octyl (branched $C_8$), decyl ($C_{10}$), lauryl ($C_{12}$), myristyl ($C_{14}$), cetyl ($C_{16}$), cetearyl ($C_{16}$-$C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), and the like.

Examples of linear and branched alkyl groups having about 8 to about 30 carbon atoms that are derived from a natural source include, without being limited thereto, alkyl groups derived from hydrogenated peanut oil, soybean oil and canola oil (all predominately $C_{18}$), hydrogenated tallow oil ($C_{16}$-$C_{18}$), and the like; and hydrogenated $C_{10}$-$C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$-$C_{30}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like.

Exemplary aryl-substituted $C_2$-$C_{40}$ alkyl groups include, without limitation, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Suitable $C_7$-$C_{30}$ carbocyclic groups include, without limitation, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the present invention include, without limitation, cyclooctyl, cyclododecyl, adamantyl, decahydronaphthyl, and groups derived from natural carbocyclic materials, such as pinene, hydrogenated retinol, camphor, isobornyl alcohol, norbornyl alcohol, nopol and the like.

Useful alkoxylated associative monomers can be prepared by any method known in the art. See, for example, U.S. Pat. No. 4,421,902 to Chang et al.; U.S. Pat. No. 4,384,096 to Sonnabend; U.S. Pat. No. 4,514,552 to Shay et al.; U.S. Pat. No. 4,600,761 to Ruffner et al.; U.S. Pat. No. 4,616,074 to Ruffner; U.S. Pat. No. 5,294,692 to Barron et al.; U.S. Pat. No. 5,292,843 to Jenkins et al.; U.S. Pat. No. 5,770,760 to Robinson; U.S. Pat. No. 5,412,142 to Wilkerson, III et al.; and U.S. Pat. No. 7,772,421, to Yang et al., the pertinent disclosures of which are incorporated herein by reference.

In one aspect, exemplary alkoxylated associative monomers include those represented by formulas below:

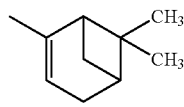

IV

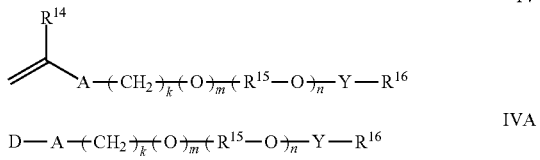

IVA wherein $R^{14}$ is hydrogen or methyl; A is —$CH_2C(O)O$—, —$C(O)O$—, —$O$—, —$CH_2O$—, —$NHC(O)NH$—, —$C(O)NH$—, —Ar—$(CE_2)_z$-$NHC(O)O$—, —Ar—$(CE_2)_z$-$NHC(O)NH$—, or —$CH_2CH_2NHC(O)$—; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; D represents a vinyl or an allyl moiety; $(R^{15}$—$O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150 in one aspect, from about 10 to about 120 in another aspect, and from about 15 to about 60 in a further aspect; Y is —$R^{15}O$—, —$R^{15}NH$—, —$C(O)$—, —$C(O)NH$—, —$R^{15}NHC(O)NH$—, —$C(O)NHC(O)$—, or a divalent alkylene radical containing 1 to 5 carbon atoms, e.g., methylene, ethylene, propylene, butylene, pentylene; $R^{16}$ is a substituted or unsubstituted alkyl selected from a $C_8$-$C_{30}$ linear alkyl, a $C_8$-$C_{30}$ branched alkyl, a $C_7$-$C_{30}$ carbocyclic, a $C_2$-$C_{30}$ alkyl-substituted phenyl, an araalkyl substituted phenyl, and an aryl-substituted $C_2$-$C_{30}$ alkyl; wherein the $R^{16}$ alkyl group, aryl group, phenyl group, or carbocyclic group optionally comprises one or more substituents selected from the group consisting of a methyl group, a hydroxyl group, an alkoxyl group, benzyl group phenylethyl group, and a halogen group. In one aspect, Y is ethylene and $R^{16}$ is

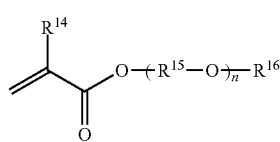

In one aspect, the hydrophobically modified alkoxylated associative monomer is an alkoxylated (meth)acrylate having a hydrophobic group containing 8 to 30 carbon atoms represented by the following formula:

IVB $$\text{CH}_2=\text{C}(R^{14})-\text{C}(O)-O-(R^{15}-O)_n-R^{16}$$

wherein $R^{14}$ is hydrogen or methyl; $R^{15}$ is a divalent alkylene moiety independently selected from $C_2H_4$, $C_3H_6$, and $C_4H_8$, and n represents an integer ranging from about 2 to about 150 in one aspect, from about 5 to about 120 in another aspect, from about 10 to about 60 in a further aspect, and from about 15 to about 30 in a still further aspect, ($R^{15}$—O) can be arranged in a random or a block configuration; $R^{16}$ is a substituted or unsubstituted alkyl selected from a $C_8$-$C_{30}$ linear alkyl, a $C_8$-$C_{30}$ branched alkyl, an alkyl substituted and unsubstituted $C_7$-$C_{30}$ carbocyclic alkyl, a $C_2$-$C_{30}$ alkyl-substituted phenyl, and an aryl-substituted $C_2$-$C_{30}$ alkyl.

Representative monomers under Formula V include lauryl polyethoxylated (meth)acrylate (LEM), cetyl polyethoxylated (meth)acrylate (OEM), cetearyl polyethoxylated (meth)acrylate (CSEM), stearyl polyethoxylated (meth)acrylate, arachidyl polyethoxylated (meth)acrylate, behenyl polyethoxylated (meth)acrylate (BEM), cerotyl polyethoxylated (meth)acrylate, montanyl polyethoxylated (meth)acrylate, melissyl polyethoxylated (meth)acrylate, phenyl polyethoxylated (meth)acrylate, nonylphenyl polyethoxylated (meth)acrylate, ω-tristyrylphenyl polyoxyethylene (meth)acrylate, where the polyethoxylated portion of the monomer contains about 2 to about 150 ethylene oxide units in one aspect, from about 5 to about 120 in another aspect, from about 10 to about 60 in a further aspect, and from about 15 to about 30 in a still further aspect; octyloxy polyethyleneglycol (8) polypropyleneglycol (6) (meth)acrylate, phenoxy polyethylene glycol (6) polypropylene glycol (6) (meth)acrylate, and nonylphenoxy polyethylene glycol polypropylene glycol (meth)acrylate.

Monomer vi is an alkoxylated semi-hydrophobic monomer that is structurally similar to the associative monomer described above, but have a substantially non-hydrophobic end group portion. The alkoxylated semi-hydrophobic monomer has an ethylenically unsaturated end group portion (i) for addition polymerization with the other monomers of the invention; a polyoxyalkylene mid-section portion (ii) for imparting selective hydrophilic and/or hydrophobic properties to the product polymer and a semi-hydrophobic end group portion (iii). The unsaturated end group portion (i) supplying the vinyl or other ethylenically unsaturated end group for addition polymerization is preferably derived from an α,β-ethylenically unsaturated mono carboxylic acid. Alternatively, the end group portion (i) can be derived from an allyl ether residue, a vinyl ether residue or a residue of a nonionic urethane monomer.

The polyoxyalkylene mid-section (ii) specifically comprises a polyoxyalkylene segment, which is substantially similar to the polyoxyalkylene portion of the associative monomers described above. In one aspect, the polyoxyalkylene portions (ii) include polyoxyethylene, polyoxypropylene, and/or polyoxybutylene units comprising from about 2 to about 150 in one aspect, from about 5 to about 120 in another aspect, and from about 10 to about 60 in a further aspect, of ethylene oxide, propylene oxide, and/or butylene oxide units, arranged in random or blocky sequences.

In one aspect, the semi-hydrophobic monomer can be represented by the following formulas:

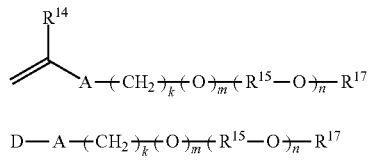

wherein $R^{14}$ is hydrogen or methyl; A is $-CH_2C(O)O-$, $-C(O)O-$, $-O-$, $-CH_2O-$, $-NHC(O)NH-$, $-C(O)NH-$, $-Ar-(CE_2)_z-NHC(O)O-$, $-Ar-(CE_2)_z-NHC(O)NH-$, or $-CH_2CH_2NHC(O)-$; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; $(R^{15}-O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150 in one aspect, from about 5 to about 120 in another aspect, and from about 10 to about 60 in a further aspect; $R^{17}$ is selected from hydrogen and a linear or branched $C_1$-$C_4$ alkyl group (e.g., methyl, ethyl, propyl, iso-propyl, butyl, iso-butyl, and tert-butyl); and D represents a vinyl or an allyl moiety.

In one aspect, the semi-hydrophobic monomer under formula V can be represented by the following formulas:

$CH_2=C(R^{14})C(O)O-(C_2H_4O)_a(C_3H_6O)_b-H$     VA $CH_2=C(R^{14})C(O)O-(C_2H_4O)_a(C_3H_6O)_b-CH_3$     VB wherein $R^{14}$ is hydrogen or methyl, and "a" is an integer ranging from 0 or 2 to about 120 in one aspect, from about 5 to about 45 in another aspect, and from about 10 to about 0.25 in a further aspect, and "b" is an integer ranging from about 0 or 2 to about 120 in one aspect, from about 5 to about 45 in another aspect, and from about 10 to about 0.25 in a further aspect, subject to the proviso that "a" and "b" cannot be 0 at the same time.

Examples of semi-hydrophobic monomers under formula VIIIA include polyethyleneglycol methacrylate available under the product names Blemmer® PE-90 ($R^{14}$=methyl, a=2, b=0), PE-200 ($R^{14}$=methyl, a=4.5, b=0), and PE-350 ($R^{14}$=methyl a=8, b=0); polypropylene glycol methacrylate available under the product names Blemmer® PP-1000 ($R^{14}$=methyl, b=4-6, a=0), PP-500 ($R^{14}$=methyl, a=0, b=9), PP-800 ($R^{14}$=methyl, a=0, b=13); polyethyleneglycol polypropylene glycol methacrylate available under the product names Blemmer® 50PEP-300 ($R^{14}$=methyl, a=3.5, b=2.5), 70PEP-350B ($R^{14}$=methyl, a=5, b=2); polyethyleneglycol acrylate available under the product names Blemmer® AE-90 ($R^{14}$=hydrogen, a=2, b=0), AE-200 ($R^{14}$=hydrogen, a=2, b=4.5), AE-400 ($R^{14}$=hydrogen, a=10, b=0); polypropyleneglycol acrylate available under the product names Blemmer® AP-150 ($R^{14}$=hydrogen, a=0, b=3), AP-400 ($R^{14}$=hydrogen, a=0, b=6), AP-550 ($R^{14}$=hydrogen, a=0, b=9). Blemmer® is a trademark of NOF Corporation, Tokyo, Japan.

Examples of semi-hydrophobic monomers under formula VIIIB include methoxypolyethyleneglycol methacrylate available under the product names Visiomer® MPEG 750 MA W ($R^{14}$=methyl, a=17, b=0), MPEG 1005 MA W ($R^{14}$=methyl, a=22, b=0), MPEG 2005 MA W ($R^{14}$=methyl, a=45, b=0), and MPEG 5005 MA W ($R^{14}$=methyl, a=113, b=0) from Evonik Röhm GmbH, Darmstadt, Germany); Bisomer® MPEG 350 MA ($R^{14}$=methyl, a=8, b=0), and MPEG 550 MA ($R^{14}$=methyl, a=12, b=0) from GEO Specialty Chemicals, Ambler Pa.; Blemmer® PME-100 ($R^{14}$=methyl, a=2, b=0), PME-200 ($R^{14}$=methyl, a=4, b=0), PME400 ($R^{14}$=methyl, a=9, b=0), PME-1000 ($R^{14}$=methyl, a=23, b=0), PME-4000 ($R^{14}$=methyl, a=90, b=0).

In one aspect, the semi-hydrophobic monomer set forth in formula IX can be represented by the following formulas:

$CH_2=CH-O-(CH_2)_d-O-(C_3H_6O)_e-(C_2H_4O)_f-H$     VIA $CH_2=CH-CH_2-O-(C_3H_6O)_g-(C_2H_4O)_h-H$     VIB wherein d is an integer of 2, 3, or 4; e is an integer in the range of from about 1 to about 10 in one aspect, from about 2 to about 8 in another aspect, and from about 3 to about 7 in a further aspect; f is an integer in the range of from about 5 to about 50 in one aspect, from about 8 to about 40 in another aspect, and from about 10 to about 30 in a further aspect; g is an integer in the range of from 1 to about 10 in one aspect, from about 2 to about 8 in another aspect, and from about 3 to about 7 in a further aspect; and h is an integer in the range of from about 5 to about 50 in one aspect, and from about 8 to about 40 in another aspect; e, f, g, and h can be 0 subject to the proviso that e and f cannot be 0 at the same time, and g and h cannot be 0 at the same time.

Monomers under formulas VIA and VIB are commercially available under the trade names Emulsogen® R109, R208, R307, RAL109, RAL208, and RAL307 sold by Clariant Corporation; BX-AA-E5P5 sold by Bimax, Inc.; and combinations thereof. EMULSOGEN7 R109 is a randomly ethoxylated/propoxylated 1,4-butanediol vinyl ether having the empirical formula $CH_2=CH—O(CH_2)_4O(C_3H_6O)_4(C_2H_4O)_{10}H$; Emulsogen® R208 is a randomly ethoxylated/propoxylated 1,4-butanediol vinyl ether having the empirical formula $CH_2=CH—O(CH_2)_4O(C_3H_6O)_4(C_2H_4O)_{20}H$; Emulsogen® R307 is a randomly ethoxylated/propoxylated 1,4-butanediol vinyl ether having the empirical formula $CH_2=CH—O(CH_2)_4O(C_3H_6O)_4(C_2H_4O)_{30}H$; Emulsogen® RAL109 is a randomly ethoxylated/propoxylated allyl ether having the empirical formula $CH_2=CHCH_2O(C_3H_6O)_4(C_2H_4O)_{10}H$; Emulsogen® RAL208 is a randomly ethoxylated/propoxylated allyl ether having the empirical formula $CH_2=CHCH_2O(C_3H_6O)_4(C_2H_4O)_{20}H$; Emulsogen® RAL307 is a randomly ethoxylated/propoxylated allyl ether having the empirical formula $CH_2=CHCH_2O(C_3H_6O)_4(C_2H_4O)_{30}H$; and BX-AA-E5P5 is a randomly ethoxylated/propoxylated allyl ether having the empirical formula $CH_2=CHCH_2O(C_3H_6O)_5(C_2H_4O)_5H$.

In the associative and semi-hydrophobic monomers of the invention, the polyoxyalkylene mid-section portion contained in these monomers can be utilized to tailor the hydrophilicity and/or hydrophobicity of the polymers in which they are included. For example, mid-section portions rich in ethylene oxide moieties are more hydrophilic while mid-section portions rich in propylene oxide moieties are more hydrophobic. By adjusting the relative amounts of ethylene oxide to propylene oxide moieties present in these monomers the hydrophilic and hydrophobic properties of the polymers in which these monomers are included can be tailored as desired.

The amount of associative and/or semi-hydrophobic monomer utilized in the preparation of the polymers of the present invention can vary widely and depends, among other things, on the final rheological and aesthetic properties desired in the polymer. When utilized, the monomer reaction mixture contains one or more monomers selected from the associative and/or semi-hydrophobic monomers disclosed above in amounts ranging from about 0.01 to about 15 wt. % in one aspect, from about 0.1 wt. % to about 10 wt. % in another aspect, from about 0.5 to about 8 wt. % in still another aspect and from about 1, 2 or 3 to about 5 wt. % in a further aspect, based on the weight of the total monomers.

Ionizable Monomer

In one aspect of the invention, the crosslinked, nonionic, vinyl acetate rich polymer compositions of the invention can be polymerized from a monomer composition including 0 to 5 wt. % of an ionizable and/or ionized monomer, based on the weight of the total monomers, so long as the yield stress value of the yield stress fluids in which the polymers of the invention are included are not deleteriously affected (i.e., the yield stress value of the fluid does not fall below 0.1 Pa).

In another aspect, the vinyl acetate rich polymer compositions of the invention can be polymerized from a monomer composition comprising less than 3 wt. % in one aspect, less than 1 wt. % in a further aspect, less than 0.5 wt. % in a still further aspect, less than 0.1 wt. % in an additional aspect, and less than 0.05 wt. % in a further aspect, of an ionizable and/or an ionized moiety, based on the weight of the total monomers.

Ionizable monomers include monomers having a base neutralizable moiety and monomers having an acid neutralizable moiety. Base neutralizable monomers include olefinically unsaturated monocarboxylic and dicarboxylic acids and their salts containing 3 to 5 carbon atoms and anhydrides thereof. Examples include (meth)acrylic acid, itaconic acid, maleic acid, maleic anhydride, and combinations thereof. Other acidic monomers include styrenesulfonic acid, acrylamidomethylpropanesulfonic acid (AMPS® monomer), vinylsulfonic acid, vinylphosphonic acid, allylsulfonic acid, methallylsulfonic acid; and salts thereof.

Acid neutralizable monomers include olefinically unsaturated monomers which contain a basic nitrogen atom capable of forming a salt or a quaternized moiety upon the addition of an acid. For example, these monomers include vinylpyridine, vinylpiperidine, vinylimidazole, vinylmethylimidazole, dimethylaminomethyl (meth)acrylate, dimethylaminoethyl (meth)acrylate, diethylaminomethyl (meth)acrylate and methacrylate, dimethylaminoneopentyl (meth)acrylate, dimethylaminopropyl (meth)acrylate, and diethylaminoethyl (meth)acrylate.

Crosslinking Monomer

The crosslinked, nonionic, vinyl acetate rich polymers useful in the practice of the invention are prepared from a monomer composition comprising at least 65 wt. % vinyl acetate, a crosslinking monomer and, optionally, one or more monomers selected from monomers i) through vi) described above. The crosslinking monomer(s) is utilized to polymerize covalent crosslinks into the backbone of the vinyl acetate rich polymer. Surprisingly, it has been discovered that polymerizing a vinyl acetate rich monomer composition with a polyalkenyl polyether crosslinker having at least two polymerizable ethylenically unsaturated double bonds in the presence of a redox initiator system wherein the oxidant is selected from a hydrophobic hydroperoxide yields crosslinked, nonionic, vinyl acetate rich polymer having yield stress properties.

In one aspect, the crosslinking monomer is a polyunsaturated compound containing an average of at least 2 unsaturated moieties. In another aspect, the crosslinking monomer contains an average of at least 3 unsaturated moieties. Exemplary polyunsaturated compounds include polyallyl ethers of sucrose having from 2 to 8 allyl groups per molecule, polyallyl ethers of pentaerythritol such as pentaerythritol diallyl ether, pentaerythritol triallyl ether, and pentaerythritol tetraallyl ether, and combinations thereof; polyallyl ethers of trimethylolpropane such as trimethylolpropane diallyl ether, trimethylolpropane triallyl ether, and combinations thereof.

Mixtures of two or more of the foregoing polyunsaturated compounds can also be utilized to crosslink the nonionic, vinyl acetate rich polymers of the invention. In one aspect, the mixture of unsaturated crosslinking monomer contains an average of 2 unsaturated moieties. In another aspect, the mixture of crosslinking monomers contains an average of 2.5 unsaturated moieties. In still another aspect, the mixture of crosslinking monomers contains an average of about 3 unsaturated moieties. In a further aspect, the mixture of crosslinking monomers contains an average of about 3.5 unsaturated moieties.

In one embodiment of the invention, the crosslinking monomer component can be used in an amount ranging from about 0.01 to about 1 wt. % in one aspect, from about 0.05 to about 0.75 wt. % in another aspect, and from about 0.1 to about 0.5 wt. % in a further aspect, and from about 0.15 to about 0.35 wt. % in a still further aspect, based on the dry weight of the crosslinked, nonionic, vinyl acetate rich polymer of the invention.

In another embodiment of the invention, the crosslinking monomer component contains an average of about 3 unsaturated moieties and can be used in an amount ranging from about 0.01 to about 0.3 wt. % in one aspect, from about 0.02 to about 0.25 wt. % in another aspect, from about 0.05 to about 0.2 wt. % in a further aspect, and from about 0.075 to about 0.175 wt. % in a still further aspect, and from about 0.1 to about 0.15 wt. % in another aspect, based upon the total weight of the nonionic, vinyl acetate rich polymer of the invention.

Polymer Synthesis

The process for preparing the crosslinked, nonionic, vinyl acetate rich polymer of this invention includes providing a monomer composition comprising at least 65 wt. % of vinyl acetate monomer, at least 0.01 wt. % of a crosslinking monomer selected from at least one polyalkenyl polyether having at least two polymerizable ethylenically unsaturated double bonds, and a free radical redox initiator system under emulsion polymerization conditions.

The redox initiator system comprises a redox couple, an oxidant (a free radical generating agent) and a reducing agent (to promote decomposition of the free radical generating agent). The oxidant is a hydrophobic hydroperoxide including a tertiary $C_4$ to $C_6$ alkyl hydroperoxide, cumene hydroperoxide, and mixtures. Representative tertiary $C_4$ to $C_6$ alkyl hydroperoxides include t-butyl hydroperoxide, t-amyl hydroperoxide, and mixtures thereof.

The reducing agent is selected from any compound capable of decomposing the hydrophobic hydroperoxide to form a free radical initiator species. Exemplary reducing agents include, but are not limited to, sodium and ammonium sulfite; sodium and ammonium bisulfite; sodium and ammonium thiosulfate; sodium and ammonium hydrosulfite; sodium and ammonium sulfide; sodium and ammonium hydrosulfide; formamidine sulfinic acid, hydroxymethanesulfonic acid, acetone bisulfite, ethanolamine, glycolic acid and salts thereof, glyoxylic acid hydrate, ascorbic acid and salts thereof, erythorbic acid (isoascorbic acid) and salts thereof, lactic acid and salts thereto, glyceric acid and salts thereof, malic acid and salts thereof, 2-hydroxy-2-sulfinatoacetic acid and salts thereof, 2-hydroxy-2-sulfonatoacetic acid and salts thereof, tartaric acid and salts thereof; and mixtures thereof.

The amount of free radical polymerization initiating agent (oxidant) present in the emulsion polymerization composition may vary depending upon the particular composition of monomers employed and the polymerization conditions desired. In general, the amount of oxidant will be an amount effective to obtain the desired polymer composition. Typically, the amount of oxidant is present in an amount ranging from about 0.01 to about 10 wt. % in one aspect, from about 0.02 to about 3 wt. % in another aspect, from about 0.05 to about 1 wt. % in a still another aspect, and from about 0.1 to about 0.5 wt. % in a further aspect, based on the weight of the dry polymer.

The amount of reducing agent (reductant) is added in an equivalent amount sufficient to promote the decomposition of the oxidant to form free radicals. Typically the level of reducing agent utilized ranges from about 0.01 to about 10 wt. % in one aspect, from about 0.01 to about 3 wt. % in another aspect, from about 0.025 to about 1 wt. % in a still another aspect, and from about 0.1 to about 0.5 wt. % in a further aspect, based on the weight of the dry polymer. In another aspect, the ratio of oxidant compound to reductant compound can range from about 30:1 to 0.05:1 on a weight basis.

Redox reaction catalyzing metal salts of iron, copper, manganese, silver, platinum, vanadium, nickel, chromium, palladium or cobalt may optionally be utilized in the reaction, with or without metal complexing agents.

The oxidant and reductant are typically added to the monomer composition in separate streams. The oxidant and reductant can be added in any order so long as sufficient free radicals are generated to conduct the desired polymerization reaction. Further additions of the redox couple (oxidant and reductant) can be added in any order and at any time during the polymerization reaction after the addition of the initial redox couple in order to reduce any residual vinyl acetate monomer or residual copolymerizable monomer(s).

The polymerization can be carried out the presence of chain transfer agents. Suitable chain transfer agents include, but are not limited to, thio- and disulfide containing compounds, such as $C_1$-$C_{18}$ alkyl mercaptans, such as tert-butyl mercaptan, n-octyl mercaptan, n-dodecyl mercaptan, tert-dodecyl mercaptan hexadecyl mercaptan, octadecyl mercaptan; mercaptoalcohols, such as 2-mercaptoethanol, 2-mercaptopropanol; mercaptocarboxylic acids, such as mercaptoacetic acid and 3-mercaptopropionic acid; mercaptocarboxylic acid esters, such as butyl thioglycolate, isooctyl thioglycolate, dodecyl thioglycolate, isooctyl 3-mercaptopropionate, and butyl 3-mercaptopropionate; thioesters; $C_1$-$C_{18}$ alkyl disulfides; aryldisulfides; polyfunctional thiols such as trimethylolpropane-tris-(3-mercaptopropionate), pentaerythritol-tetra-(3-mercaptopropionate), pentaerythritol-tetra-(thioglycolate), pentaerythritol-tetra-(thiolactate), dipentaerythritol-hexa-(thioglycolate), and the like; phosphites and hypophosphites; $C_1$-$C_4$ aldehydes, such as formaldehyde, acetaldehyde, propionaldehyde; haloalkyl compounds, such as carbon tetrachloride, bromotrichloromethane, and the like; hydroxylammonium salts such as hydroxylammonium sulfate; formic acid; sodium bisulfite; isopropanol; and catalytic chain transfer agents such as, for example, cobalt complexes (e.g., cobalt (II) chelates).

The chain transfer agents are generally used in amounts ranging from 0.1 to 10 wt. %, based on the total weight of the monomers present in the polymerization medium.

In emulsion polymerization processes it can be advantageous to stabilize the monomer/polymer droplets or particles by means of surface active auxiliaries. Typically, these are emulsifiers or protective colloids. Emulsifiers used can be anionic, nonionic, cationic or amphoteric. Suitable anionic surfactants for facilitating emulsion polymerizations are well known in the art and include, but are not limited to ($C_6$-$C_{18}$) alkyl sulfates, ($C_{14}$-$C_{16}$) alpha-olefin sulfonates, ($C_6$-$C_{18}$) alkyl ether sulfates (e.g., sodium lauryl sulfate and sodium laureth sulfate), amino and alkali metal salts of dodecylbenzenesulfonic acid, such as sodium dodecyl benzene sulfonate and dimethylethanolamine dodecylbenzenesulfonate, sodium ($C_6$-$C_{16}$) alkyl phenoxy benzene sulfonate, disodium ($C_6$-$C_{16}$) alkyl phenoxy benzene sulfonate, disodium ($C_6$-$C_{16}$) di-alkyl phenoxy benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, and the like.

Nonionic surfactants suitable for facilitating emulsion polymerizations are well known in the polymer art, and include, without limitation, linear or branched $C_8$-$C_{30}$ fatty alcohol ethoxylates, such as capryl alcohol ethoxylate, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and, behenyl alcohol ethoxylate; alkylphenol alkoxylates, such as octylphenol ethoxylates; and polyoxyethylene polyoxypropylene block copolymers, and the like. Additional fatty alcohol ethoxylates suitable as non-ionic surfactants are described below. Other useful nonionic surfactants include $C_8$-$C_{22}$ fatty acid esters of polyoxyethylene glycol, ethoxylated mono- and diglycerides, sorbitan esters and ethoxylated sorbitan esters, $C_8$-$C_{22}$ fatty acid glycol esters, block copolymers of ethylene oxide and propylene oxide, and combinations thereof. The number of ethylene oxide units in each of the foregoing ethoxylates can range from 2 and above in one aspect, and from 2 to about 150 in another aspect.

Examples of cationic and amphoteric emulsifiers used are quaternized amine alkoxylates, alkylbetaines, alkylamidobetaines and sulfobetaines. The amount of emulsifying agent typically ranges from about 1 to about 10 wt. % in one aspect, and from about 2 to about 8 wt. % in another aspect, based on the weight of the monomers utilized in the polymerization. The emulsifier used in the polymerization reaction can be added in its entirety with the initial monomer charge to the polymerization reactor, or a portion of the emulsifier, e.g., from 25 to 90 percent, can be added continuously or intermittently during polymerization.

Various protective colloids can also be used in addition to the above described emulsifiers. Examples of typical protective colloids are cellulose derivatives, polyethylene glycol, polypropylene glycol, copolymers of ethylene glycol and propylene glycol, polyvinyl acetate, poly(vinyl alcohol), partially hydrolyzed poly(vinyl alcohol), polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or anhydride copolymers. The protective colloids are customarily used in concentrations ranging from about 0.05 to about 5 wt. %, based on the weight of the total emulsion.

In one embodiment of the invention, the protective colloid is selected from poly(vinyl alcohol) that has a degree of hydrolysis ranging from about 80 to 95% in one aspect, and from about 85 to 90% in another aspect.

The polymerization reaction can be carried out under an inert atmosphere, such as nitrogen, at temperatures ranging from about 40 to about 80° C. in one aspect, from about 55 to about 70° C. in another aspect, and from about 60 to about 65° C. in a further aspect.

The polymerization can be carried out at a pH ranging between 2 and 7 in one aspect, and between 3 and 5 in another aspect. In order to maintain the pH range, it may be useful to utilize customary buffer systems, for example, alkali metal acetates, alkali metal carbonates, and alkali metal phosphates.

The polymerization reaction is generally continued until the residual monomer vinyl acetate monomer content in the reaction medium is below about 1% in one aspect, below about 0.5% in another aspect, and below about 0.2% in a further aspect. The completed reaction is allowed to cool to room temperature under inert atmosphere.

The emulsion process can be conducted in in a single reactor or in multiple reactors as is well-known in the art. The monomers can be added as a premixed batch mixture or each monomer can be metered into the reactor in a staged process. A typical mixture in emulsion polymerization comprises water, monomer(s), an initiator (usually water-soluble) and an emulsifier. The monomers may be emulsion polymerized in a single-stage, two-stage or multi-stage polymerization process according to well-known methods in the emulsion polymerization art. In a two-stage polymerization process, the first stage monomers are added and polymerized first in the aqueous medium, followed by addition and polymerization of the second stage monomers. The aqueous medium can optionally contain an organic solvent. If utilized the organic solvent is less than about 5 wt. % of the aqueous medium. Suitable examples of water-miscible organic solvents include, without limitation, esters, alkylene glycol ethers, alkylene glycol ether esters, lower molecular weight aliphatic alcohols, and the like.

In a typical two stage redox emulsion polymerization, a mixture of the monomers is added to a first reactor under inert atmosphere to a solution of emulsifying surfactant (e.g., anionic surfactant) in water. Optional processing aids can be added as desired (e.g., protective colloids, auxiliary emulsifier(s)). The contents of the reactor are agitated to prepare a monomer emulsion. To a second reactor equipped with an agitator, an inert gas inlet, and feed pumps are added under inert atmosphere a desired amount of water and additional anionic surfactant and optional processing aids. The contents of the second reactor are heated with mixing agitation. After the contents of the second reactor reaches a temperature in the range of about 55 to 70° C., a free radical redox initiator is injected into the so formed aqueous surfactant solution in the second reactor, and the monomer emulsion from the first reactor is gradually metered into the second reactor over a period typically ranging from about one half to about four hours. The reaction temperature is controlled in the range of about 45 to about 95° C. After completion of the monomer addition, an additional quantity of free radical initiator can optionally be added to the second reactor, and the resulting reaction mixture is typically held at a temperature of about 45 to 95° C. for a time period sufficient to complete the polymerization reaction to obtain the polymer emulsion. Temperature ranges can vary depending on the monomer(s) employed and the desired reaction conditions.

In one aspect, the crosslinked, nonionic, vinyl acetate rich polymers of the invention are prepared by providing a monomer mixture comprising from about 65 to about 100 wt. % (based on the total monomer weight) of vinyl acetate, at least 0.1 wt. % (based on dry polymer weight) of a crosslinking monomer selected from at least one polyalkenyl polyether having at least two polymerizable ethylenically unsaturated double bonds, from about 0 to about 35 wt. % (based on the total monomer weight) of a copolymerizable monomer selected from:
  i) at least one $C_1$-$C_{22}$ alkyl (meth)acrylate;
  ii) at least one N-vinyl amide;
  iii) at least one vinyl ester (other than vinyl acetate) of an aliphatic carboxylic acid containing an acyl moiety having 2 to 22 carbon atoms;
  iv) at least one amino($C_1$-$C_5$)alkyl (meth)acrylate, at least one hydroxy($C_1$-$C_5$)alkyl (meth)acrylate, and combinations thereof;
  v) at least one alkoxylated associative monomer;
  vi) at least one alkoxylated semi-hydrophobic monomer; and
  vii) mixtures of i) through vi); and
  polymerizing the monomer mixture under emulsion polymerization conditions in the presence of a free radical redox initiator pair comprising an oxidant and a reducing agent in a sufficient amount to initiate polymerization, wherein said oxidant is selected from a hydrophobic hydroperoxide.

In one aspect, the crosslinked, nonionic, vinyl acetate rich polymers of the invention are prepared by providing a monomer mixture comprising from about 70 to about 95 wt. % (based on the total monomer weight) of vinyl acetate, at least 0.1 wt. % (based on dry polymer weight) of a crosslinking monomer selected from at least one polyalkenyl polyether having at least two polymerizable ethylenically unsaturated double bonds, from about 5 to about 30 wt. % of a copolymerizable monomer selected from:
  i) at least one $C_1$-$C_5$ alkyl (meth)acrylate;
  ii) at least one N-vinyl amide; and mixtures of i) and ii); and polymerizing the monomer mixture under emulsion polymerization conditions in the presence of a free radical redox initiator pair comprising an oxidant and a reducing agent in a sufficient amount to initiate polymerization, wherein said oxidant is selected from a hydrophobic hydroperoxide.

In one aspect, the crosslinked, nonionic, vinyl acetate rich polymers of the invention are prepared by providing a monomer mixture comprising from about 70 to about 95 wt. % (based on the total monomer weight) of vinyl acetate, at least 0.1 wt. % (based on dry polymer weight) of a crosslinking monomer selected from at least one polyalkenyl polyether having at least two polymerizable ethylenically unsaturated double bonds, from about 5 to about 30 wt. % of a copolymerizable monomer selected from:
  i) ethyl acrylate, butyl acrylate, and mixtures thereof;
  ii) N-vinyl-2-pyrrolidinone; and mixtures of i) and ii); and polymerizing the monomer mixture under emulsion polymerization conditions in the presence of a free radical redox initiator pair comprising an oxidant and a reducing agent in a sufficient amount to initiate polymerization, wherein said oxidant is selected from a hydrophobic hydroperoxide.

In one aspect, the crosslinked, nonionic, vinyl acetate rich polymers of the invention are prepared by providing a monomer mixture comprising from about 70 to about 95 wt. % (based on the total monomer weight) of vinyl acetate, at least 0.1 wt. % (based on dry polymer weight) of a crosslinking monomer selected from at least one polyalkenyl polyether having at least two polymerizable ethylenically unsaturated double bonds, from about 5 to about 10 wt. % (based on the total monomer weight) of a copolymerizable monomer selected from N-vinyl-2-pyrrolidinone, and 0 to 20 wt. % of a copolymerizable monomer selected from ethyl acrylate, butyl acrylate, and mixtures thereof, and polymerizing the monomer mixture under emulsion polymerization conditions in the presence of a free radical redox initiator pair comprising an oxidant and a reducing agent in a sufficient amount to initiate polymerization, wherein said oxidant is selected from a hydrophobic hydroperoxide.

Yield Stress Fluids

In one exemplary aspect of the invention, the yield stress fluid of the invention comprises: i) at least one crosslinked, nonionic vinyl acetate rich polymer(s) prepared by the process described previously; ii) at least one surfactant selected from at least one anionic surfactant, at least one cationic surfactant, at least one amphoteric surfactant, at least one nonionic surfactant, and combinations thereof; and iii) water.

In another exemplary aspect of the invention, the yield stress fluid of the invention comprises: i) at least one crosslinked, nonionic vinyl acetate rich polymer(s) prepared by the process described previously; ii) at least one anionic surfactant; and iii) water.

In another exemplary aspect of the invention, the yield stress fluid of the invention comprises: i) at least one crosslinked, nonionic vinyl acetate rich polymer(s) prepared by the process described previously; ii) at least one anionic surfactant and at least one amphoteric surfactant; and iii) water.

Surprisingly, the present vinyl acetate rich polymers prepared by the emulsion redox polymerization process described herein can be activated by a surfactant to provide a stable yield stress fluid with desirable rheological and aesthetic properties with the ability to suspend particulate and insoluble materials in an aqueous medium for indefinite periods of time and independent of pH. The yield stress value, elastic modulus and optical clarity are substantially independent of pH in the compositions in which they are included. The yield stress fluid of the invention is useful in the pH range of from about 2 to about 14 in one aspect, from about 3 to 11 in another aspect, and from about 4 to about 9 in a further aspect. Unlike the pH-responsive crosslinked polymers (acid or base sensitive) that require neutralization with an acid or a base to impart a desired rheological profile, the rheological profiles of the crosslinked, nonionic, vinyl acetate rich polymers of the of the invention are substantially independent of pH. By substantially independent of pH is meant that the yield stress fluid within which the polymer of the invention is included imparts a desired rheological profile (e.g., a yield stress of at least 0.1 Pa in one aspect, at least at least 0.5 Pa in another aspect, at least 1 Pa in still another aspect, and at least 2 Pa in a further aspect) across a wide pH range (e.g., from about 2 to about 14) wherein the standard deviation in yield stress values across the pH range is less than 1 Pa in one aspect, less than 0.5 Pa in another aspect, and less than 0.25 Pa in a further aspect of the invention.

In one exemplary aspect of the invention, the yield stress fluid comprises at least one crosslinked, nonionic vinyl acetate rich polymer(s) prepared by the process described previously, at least one anionic surfactant, an optional nonionic surfactant, and water.

In another exemplary aspect, the yield stress fluid comprises at least one crosslinked, nonionic vinyl acetate rich polymer(s) prepared by the process described previously, at least one anionic surfactant, at least one amphoteric surfactant, an optional nonionic surfactant, and water.

In still another exemplary aspect, the yield stress fluid comprises at least one crosslinked, nonionic vinyl acetate rich polymer(s) prepared by the process described previously, at least one anionic ethoxylated surfactant, an optional nonionic surfactant, and water. In one aspect, the average degree of ethoxylation in the anionic surfactant can range from about 1 to about 3. In another aspect, the average degree of ethoxylation is about 2.

In a further exemplary aspect, the yield stress fluid comprises at least one crosslinked, nonionic vinyl acetate rich polymer(s) prepared by the process described previously, at least one anionic ethoxylated surfactant, at least one amphoteric surfactant, an optional nonionic surfactant, and water. In one aspect, the average degree of ethoxylation in the anionic surfactant can range from about 1 to about 3. In another aspect, the average degree of ethoxylation is about 2.

In a still further exemplary aspect, the yield stress fluid comprises at least one crosslinked, nonionic vinyl acetate rich polymer(s) prepared by the process described previously, at least one anionic non-ethoxylated surfactant, at least one anionic ethoxylated surfactant, an optional nonionic surfactant, and water. In one aspect, the average degree of ethoxylation in the anionic surfactant can range from about 1 to about 3. In another aspect, the average degree of ethoxylation is about 2.

In another exemplary aspect, the yield stress fluid comprises at least one crosslinked, nonionic vinyl acetate rich polymer(s) prepared by the process described previously, at least one anionic non-ethoxylated surfactant, at least one anionic ethoxylated surfactant, at least one amphoteric surfactant, an optional nonionic surfactant, and water. In one aspect, the average degree of ethoxylation in the anionic surfactant can range from about 1 to about 3. In another aspect, the average degree of ethoxylation is about 2.

The amount of the vinyl acetate rich polymer utilized in formulating the yield stress fluid of the invention ranges from about 0.5 to about 5 wt. % polymer solids (100% active polymer) based on the weight of the total composition. In another aspect, the amount of vinyl acetate rich polymer utilized in the formulation ranges from about 0.75 wt. % to about 3.5 wt. %. In still another aspect, the amount of vinyl acetate rich polymer employed in the yield stress fluid ranges from about 1 to about 3 wt. %. In a further aspect, the amount of vinyl acetate rich polymer employed in the yield stress fluid ranges from about 1.5 wt. % to about 2.75 wt. %. In a still further aspect, the amount of vinyl acetate rich polymer utilized in the yield stress fluid ranges from about 2 to about 2.5 wt. %. The crosslinked, nonionic, vinyl acetate rich polymer utilized in formulating the yield stress fluids of the invention is an emulsion polymer.

The surfactants utilized to formulate the yield stress fluids of the invention can be selected from anionic surfactants, cationic surfactants, amphoteric surfactants, nonionic surfactants, and mixtures thereof.

Non-limiting examples of anionic surfactants are disclosed in *McCutcheon's Detergents and Emulsifiers*, North American Edition, 1998, published by Allured Publishing Corporation; and McCutcheon's, *Functional Materials*, North American Edition (1992); both of which are incorporated by reference herein in their entirety. The anionic surfactant can be any of the anionic surfactants known or previously used in the art of aqueous surfactant compositions. Suitable anionic surfactants include but are not limited to alkyl sulfates, alkyl ether sulfates, alkyl sulphonates, alkaryl sulfonates, α-olefin-sulphonates, alkylamide sulphonates, alkarylpolyether sulphates, alkylamidoether sulphates, alkyl monoglyceryl ether sulfates, alkyl monoglyceride sulfates, alkyl monoglyceride sulfonates, alkyl succinates, alkyl sulfosuccinates, alkyl sulfosuccinamates, alkyl ether sulphosuccinates, alkyl amidosulfosuccinates; alkyl sulphoacetates, alkyl phosphates, alkyl ether phosphates, alkyl ether carboxylates, alkyl amidoethercarboxylates, N-alkylamino acids, N-acyl amino acids, alkyl peptides, N-acyl taurates, alkyl isethionates, carboxylate salts wherein the acyl group is derived from fatty acids; and the alkali metal, alkaline earth metal, ammonium, amine, and triethanolamine salts thereof.

In one aspect, the cation moiety of the forgoing salts is selected from sodium, potassium, magnesium, ammonium, mono-, di- and triethanolamine salts, and mono-, di-, and tri-isopropylamine salts. The alkyl and acyl groups of the foregoing surfactants contain from about 6 to about 24 carbon atoms in one aspect, from 8 to 22 carbon atoms in another aspect and from about 12 to 18 carbon atoms in a further aspect and can be saturated or unsaturated. The aryl groups in the surfactants are selected from phenyl or benzyl. The ether containing surfactants set forth above can contain from 1 to 10 ethylene oxide and/or propylene oxide units per surfactant molecule in one aspect, and from 1 to 3 ethylene oxide units per surfactant molecule in another aspect.

Examples of suitable anionic surfactants include but are not limited to the sodium, potassium, lithium, magnesium, and ammonium salts of laureth sulfate, trideceth sulfate, myreth sulfate, $C_{12}$-$C_{13}$ pareth sulfate, $C_{12}$-$C_{14}$ pareth sulfate, and $C_{12}$-$C_{15}$ pareth sulfate, ethoxylated with 1, 2, 3, 4 or 5 moles of ethylene oxide; sodium, potassium, lithium, magnesium, ammonium, and triethanolamine lauryl sulfate, coco sulfate, tridecyl sulfate, myrstyl sulfate, cetyl sulfate, cetearyl sulfate, stearyl sulfate, oleyl sulfate, and tallow sulfate, disodium lauryl sulfosuccinate, disodium laureth sulfosuccinate, sodium cocoyl isethionate, sodium $C_{12}$-$C_{14}$ olefin sulfonate, sodium laureth-6 carboxylate, sodium methyl cocoyl taurate, sodium cocoyl glycinate, sodium myristyl sarcocinate, sodium dodecylbenzene sulfonate, sodium cocoyl sarcosinate, sodium cocoyl glutamate, potassium myristoyl glutamate, triethanolamine monolauryl phosphate, and fatty acid soaps, including the sodium, potassium, ammonium, and triethanolamine salts of a saturated and unsaturated fatty acids containing from about 8 to about 22 carbon atoms.

The cationic surfactants can be any of the cationic surfactants known or previously used in the art of aqueous surfactant compositions. Useful cationic surfactants can be one or more of those described, for example, in *McCutcheon's Detergents and Emulsifiers*, North American Edition, 1998, supra, and *Kirk-Othmer, Encyclopedia of Chemical Technology*, 4th Ed., Vol. 23, pp. 478-541, the contents of which are herein incorporated by reference. Suitable classes of cationic surfactants include but are not limited to alkyl amines, alkyl imidazolines, ethoxylated amines, quaternary compounds, and quaternized esters. In addition, alkyl amine oxides can function as a cationic surfactant at a low pH.

Alkylamine surfactants can be salts of primary, secondary and tertiary fatty $C_{12}$-$C_{22}$ alkylamines, substituted or unsubstituted, and substances sometimes referred to as "amidoamines". Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone.

Non-limiting examples of amidoamines and salts thereof include stearamido propyl dimethyl amine, stearamidopropyl dimethylamine citrate, palmitamidopropyl diethylamine, and cocamidopropyl dimethylamine lactate.

Non-limiting examples of alkyl imidazoline surfactants include alkyl hydroxyethyl imidazoline, such as stearyl hydroxyethyl imidazoline, coco hydroxyethyl imidazoline, ethyl hydroxymethyl oleyl oxazoline, and the like.

Non-limiting examples of ethyoxylated amines include PEG-cocopolyamine, PEG-15 tallow amine, quaternium-52, and the like.

Among the quaternary ammonium compounds useful as cationic surfactants, some correspond to the general formula: $(R^{20}R^{21}R^{22}R^{23}N^+)E^-$, wherein $R^{20}$, $R^{21}$, $R^{22}$, and $R^{23}$ are independently selected from an aliphatic group having from 1 to about 22 carbon atoms, or an aromatic, alkoxy, polyoxyalkylene, alkylamido, hydroxyalkyl, aryl or alkylaryl group having 1 to about 22 carbon atoms in the alkyl chain; and E is a salt-forming anion such as those selected from halogen, (e.g., chloride, bromide), acetate, citrate, lactate, glycolate, phosphate, nitrate, sulfate, and alkylsulfate. The aliphatic groups can contain, in addition to carbon and hydrogen atoms, ether linkages, ester linkages, and other groups such as amino groups. The longer chain aliphatic groups, e.g., those of about 12 carbons, or higher, can be saturated or unsaturated. In one aspect, the aryl groups are selected from phenyl and benzyl.

Exemplary quaternary ammonium surfactants include, but are not limited to cetyl trimethylammonium chloride, cetylpyridinium chloride, dicetyl dimethyl ammonium chloride, dihexadecyl dimethyl ammonium chloride, stearyl dimethyl benzyl ammonium chloride, dioctadecyl dimethyl ammonium chloride, dieicosyl dimethyl ammonium chloride, didocosyl dimethyl ammonium chloride, dihexadecyl dimethyl ammonium chloride, dihexadecyl dimethyl ammonium acetate, behenyl trimethyl ammonium chloride, benzalkonium chloride, benzethonium chloride, and di(coconutalkyl) dimethyl ammonium chloride, ditallowdimethyl ammonium chloride, di(hydrogenated tallow) dimethyl ammonium chloride, di(hydrogenated tallow) dimethyl ammonium acetate, ditallowdimethyl ammonium methyl sulfate, ditallow dipropyl ammonium phosphate, and ditallow dimethyl ammonium nitrate.

At low pH, amine oxides can protonate and behave similarly to N-alkyl amines. Examples include, but are not limited to, dimethyl-dodecylamine oxide, oleyldi(2-hydroxyethyl) amine oxide, dimethyltetradecylamine oxide, di(2-hydroxyethyl)-tetradecylamine oxide, dimethylhexadecylamine oxide, behenamine oxide, cocamine oxide, decyltetradecylamine oxide, dihydroxyethyl $C_{12}$-$C_{15}$ alkoxypropylamine oxide, dihydroxyethyl cocamine oxide, dihydroxyethyl lauramine oxide, dihydroxyethyl stearamine oxide, dihydroxyethyl tallowamine oxide, hydrogenated palm kernel amine oxide, hydrogenated tallowamine oxide, hydroxyethyl hydroxypropyl $C_{12}$-$C_{15}$ alkoxypropylamine oxide, lauramine oxide, myristamine oxide, cetylamine oxide, oleamidopropylamine oxide, oleamine oxide, palmitamine oxide, PEG-3 lauramine oxide, dimethyl lauramine oxide, potassium trisphosphonomethylamine oxide, soyamidopropylamine oxide, cocamidopropylamine oxide, stearamine oxide, tallowamine oxide, and mixtures thereof.

The term "amphoteric surfactant" as used herein, is also intended to encompass zwitterionic surfactants, which are well known to formulators skilled in the art as a subset of amphoteric surfactants. Nonlimiting examples of amphoteric surfactants are disclosed *McCutcheon's Detergents and Emulsifiers*, North American Edition, supra, and McCutcheon's, *Functional Materials*, North American Edition, supra; both of which are incorporated by reference herein in their entirety. Suitable examples include but are not limited to amino acids (e.g., N-alkyl amino acids and N-acyl amino acids), betaines, sultaines, and alkyl amphocarboxylates.

Amino acid based surfactants suitable in the practice of the present invention include surfactants represented by the formula:

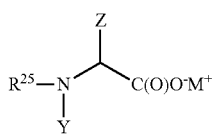

wherein $R^{25}$ represents a saturated or unsaturated hydrocarbon group having 10 to 22 carbon atoms or an acyl group containing a saturated or unsaturated hydrocarbon group having 9 to 22 carbon atoms, Y is hydrogen or methyl, Z is selected from hydrogen, —$CH_3$, —$CH(CH_3)_2$, —$CH_2CH(CH_3)_2$, —$CH(CH_3)CH_2CH_3$, —$CH_2C_6H_5$, —$CH_2C_6H_4OH$, —$CH_2OH$, —$CH(OH)CH_3$, —$(CH_2)_4NH_2$, —$(CH_2)_3NHC(NH)NH_2$, —$CH_2C(O)O^-M^+$, —$(CH_2)_2C(O)O^-M^+$. M is a salt forming cation. In one aspect, $R^{25}$ represents a radical selected from a linear or branched $C_{10}$ to $C_{22}$ alkyl group, a linear or branched $C_{10}$ to $C_{22}$ alkenyl group, an acyl group represented by $R^{26}C(O)$—, wherein $R^{26}$ is selected from a linear or branched $C_9$ to $C_{22}$ alkyl group, a linear or branched $C_9$ to $C_{22}$ alkenyl group. In one aspect, $M^+$ is a cation selected from sodium, potassium, and ammonium cations, as well as the ammonium salt of mono-, di- and triethanolamine (TEA).

The amino acid surfactants can be derived from the alkylation and acylation of α-amino acids such as, for example, alanine, arginine, aspartic acid, glutamic acid, glycine, isoleucine, leucine, lysine, phenylalanine, serine, tyrosine, and valine. Representative N-acyl amino acid surfactants are, but not limited to the mono- and di-carboxylate salts (e.g., sodium, potassium, ammonium and TEA) of N-acylated glutamic acid, for example, sodium cocoyl glutamate, sodium lauroyl glutamate, sodium myristoyl glutamate, sodium palmitoyl glutamate, sodium stearoyl glutamate, disodium cocoyl glutamate, disodium stearoyl glutamate, potassium cocoyl glutamate, potassium lauroyl glutamate, and potassium myristoyl glutamate; the carboxylate salts (e.g., sodium, potassium, ammonium and TEA) of N-acylated alanine, for example, sodium cocoyl alaninate, and TEA lauroyl alaninate; the carboxylate salts (e.g., sodium, potassium, ammonium and TEA) of N-acylated glycine, for example, sodium cocoyl glycinate, and potassium cocoyl glycinate; the carboxylate salts (e.g., sodium, potassium, ammonium and TEA) of N-acylated sarcosine, for example, sodium lauroyl sarcosinate, sodium cocoyl sarcosinate, sodium myristoyl sarcosinate, sodium oleoyl sarcosinate, and ammonium lauroyl sarcosinate; and mixtures of the foregoing surfactants.

The betaines and sultaines useful in the present invention are selected from alkyl betaines, alkylamino betaines, and alkylamido betaines, as well as the corresponding sulfobetaines (sultaines) represented by the formulas:

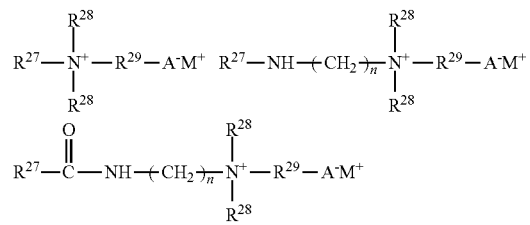

wherein $R^{27}$ is a $C_7$-$C_{22}$ alkyl or alkenyl group, each $R^{28}$ independently is a $C_1$-$C_4$ alkyl group, $R^{29}$ is a $C_1$-$C_5$ alkylene group or a hydroxy substituted $C_1$-$C_5$ alkylene group, n is an integer from 2 to 6, A is a carboxylate or sulfonate group, and M is a salt forming cation. In one aspect, $R^{27}$ is a $C_{11}$-$C_{18}$ alkyl group or a $C_{11}$-$C_{18}$ alkenyl group. In one aspect, $R^{28}$ is methyl. In one aspect, $R^{29}$ is methylene, ethylene or hydroxy propylene. In one aspect, n is 3. In a further aspect, M is selected from sodium, potassium, magnesium, ammonium cations, and the ammonium salt of mono-, di- and triethanolamine. Mixtures of the foregoing betaines and sultaines can be utilized.

Examples of suitable betaines include, but are not limited to, lauryl betaine, myristyl betaine, coco betaine, oleyl betaine, cocohexadecyl dimethylbetaine, lauryl amidopropyl betaine, cocoamidopropyl betaine (CAPB), and cocamidopropyl hydroxysultaine, and mixtures thereof.

The alkylamphocarboxylates such as the alkylamphoacetates and alkylamphopropionates (mono- and disubstituted carboxylates) can be represented by the formula:

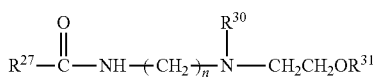

wherein $R^{27}$ is a $C_7$-$C_{22}$ alkyl or alkenyl group, $R^{30}$ is —$CH_2C(O)O^-M^+$, —$CH_2CH_2C(O)O^-M^+$, or —$CH_2CH(OH)CH_2SO_3^-M^+$, $R^{31}$ is hydrogen or —$CH_2C(O)O^-M^+$, and M is a cation selected from sodium, potassium, magnesium, ammonium, and the ammonium salt of mono-, di- and triethanolamine.

Exemplary alkylamphocarboxylates include, but are not limited to, sodium cocoamphoacetate, sodium lauroamphoacetate, sodium caprylamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

Non-limiting examples of nonionic surfactants are disclosed in *McCutcheon's Detergents and Emulsifiers*, North American Edition, 1998, supra; and McCutcheon's, *Functional Materials*, North American, supra; both of which are incorporated by reference herein in their entirety. Additional Examples of nonionic surfactants are described in U.S. Pat. No. 4,285,841, to Barrat et al., and U.S. Pat. No. 4,284,532, to Leikhim et al., both of which are incorporated by reference herein in their entirety. Nonionic surfactants typically have a hydrophobic portion, such as a long chain alkyl group or an alkylated aryl group, and a hydrophilic portion containing various degrees of ethoxylation and/or propoxylation (e.g., 1 to about 50) ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty acids, condensation products of ethylene oxide with long chain amines or amides, condensation products of ethylene oxide with alcohols, and mixtures thereof.

Suitable nonionic surfactants include, for example, alkyl polysaccharides, alcohol ethoxylates, block copolymers, castor oil ethoxylates, ceto/oleyl alcohol ethoxylates, cetearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, mono-branched alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, tallow oil fatty acid ethoxylates, tallow amine ethoxylates, tridecanol ethoxylates, acetylenic diols, polyoxyethylene sorbitols, and mixtures thereof. Various specific examples of suitable nonionic surfactants include, but are not limited to, methyl gluceth-10, PEG-20 methyl glucose distearate, PEG-20 methyl glucose sesquistearate, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, poloxamers such as poloxamer 188, polysorbate 21, polysorbate 40, polysorbate 60, polysorbate 61, polysorbate 65, polysorbate 80, polysorbate 81, polysorbate 85, sorbitan caprylate, sorbitan cocoate, sorbitan diisostearate, sorbitan dioleate, sorbitan distearate, sorbitan fatty acid ester, sorbitan isostearate, sorbitan laurate, sorbitan oleate, sorbitan palmitate, sorbitan sesquiisostearate, sorbitan sesquioleate, sorbitan sesquistearate, sorbitan stearate, sorbitan triisostearate, sorbitan trioleate, sorbitan tristearate, sorbitan undecylenate, or mixtures thereof.

Alkyl glycoside nonionic surfactants can also be employed and are generally prepared by reacting a monosaccharide, or a compound hydrolyzable to a monosaccharide, with an alcohol such as a fatty alcohol in an acid medium. For example, U.S. Pat. Nos. 5,527,892 and 5,770,543 describe alkyl glycosides and/or methods for their preparation. Suitable examples are commercially available under the names of Glucopon™ 220, 225, 425, 600 and 625, PLANTACARE®, and PLANTAPON®, all of which are available from Cognis Corporation of Ambler, Pa.

In another aspect, nonionic surfactants include, but are not limited to, alkoxylated methyl glucosides such as, for example, methyl gluceth-10, methyl gluceth-20, PPG-10 methyl glucose ether, and PPG-20 methyl glucose ether, available from Lubrizol Advanced Materials, Inc., under the trade names, Glucam® E10, Glucam® E20, Glucam® P10, and Glucam® P20, respectively; and hydrophobically modified alkoxylated methyl glucosides, such as PEG 120 methyl glucose dioleate, PEG-120 methyl glucose trioleate, and PEG-20 methyl glucose sesquistearate, available from Lubrizol Advanced Materials, Inc., under the trade names, Glucamate® DOE-120, Glucamate™ LT, and Glucamate™ SSE-20, respectively, are also suitable. Other exemplary hydrophobically modified alkoxylated methyl glucosides are disclosed in U.S. Pat. Nos. 6,573,375 and 6,727,357, the disclosures of which are hereby incorporated by reference in their entirety.

Other useful nonionic surfactants include water soluble silicones such as PEG-10 Dimethicone, PEG-12 Dimethicone, PEG-14 Dimethicone, PEG-17 Dimethicone, PPG-12 Dimethicone, PPG-17 Dimethicone and derivatized/functionalized forms thereof such as Bis-PEG/PPG-20/20 Dimethicone Bis-PEG/PPG-16/16 PEG/PPG-16/16 Dimethicone, PEG/PPG-14/4 Dimethicone, PEG/PPG-20/20 Dimethicone, PEG/PPG-20/23 Dimethicone, and Perfluorononylethyl Carboxydecyl PEG-10 Dimethicone.

The amount of the at least one surfactant (active weight basis) utilized in formulating the yield stress fluid of the invention ranges from about 1 to about 30 wt. % based on the weight of the total yield stress fluid composition. In another aspect, the amount of the at least one surfactant utilized in the formulation ranges from about 3 to about 25 wt. %. In still another aspect, the amount of the at least one surfactant employed in the yield stress fluid ranges from about 5 to about 22 wt. %. In a further aspect, the amount of the at least one surfactant utilized ranges from about 6 to about 20 wt. %. In still a further aspect, the amount of at least one surfactant is about 10, 12, 14, 16, and 18 wt. % based on the total weight yield of the stress fluid.

In one embodiment of the invention, the weight ratio (based on active material) of anionic surfactant (non-ethoxylated and/or ethoxylated) to amphoteric surfactant can range from about 10:1 to about 2:1 in one aspect, and can be 9:1, 8:1, 7:1 6:1, 5:1, 4.5:1, 4:1, or 3:1 in another aspect. When employing an ethoxylated anionic surfactant in combination with a non-ethoxylated anionic surfactant and an amphoteric surfactant, the weight ratio (based on active material) of ethoxylated anionic surfactant to non-ethoxylated anionic surfactant to amphoteric surfactant can range from about 3.5:3.5:1 in one aspect to about 1:1:1 in another aspect.

In one embodiment, the yield stress value of the fluid is at least about 0.1 Pa in one aspect, about 0.5 Pa in one aspect, at least about 1 Pa in another aspect and at least about 1.5 Pa in a further aspect. In another embodiment, the yield stress of the fluid ranges from about 0.1 to about 20 Pa in one aspect, from about 0.5 Pa to about 10 Pa in another aspect, from about 1 to about 3 Pa in a further aspect, and from about 1.5 to about 3.5 in a still further aspect.

Optionally, the yield stress fluids of the invention can contain an electrolyte. Suitable electrolytes are known compounds and include salts of multivalent anions, such as potassium pyrophosphate, potassium tripolyphosphate, and sodium or potassium citrate, salts of multivalent cations, including alkaline earth metal salts such as calcium chloride and calcium bromide, as well as zinc halides, barium chloride and calcium nitrate, salts of monovalent cations with monovalent anions, including alkali metal or ammonium halides, such as potassium chloride, sodium chloride, potassium iodide, sodium bromide, and ammonium bromide, alkali metal or ammonium nitrates, and blends thereof. The amount of the electrolyte used will generally depend on the amount of the vinyl acetate rich polymer incorporated, but may be used at concentration levels of from about 0.1 to about 4 wt. % in one aspect and from about 0.2 to about 2 wt. % in another aspect, based on the weight of the total composition.

The yield stress fluid must be easily pourable with a shear thinning index of less than 0.5 at shear rates between 0.1 and 1 reciprocal second, and an optical transmission of at least 10%. The yield stress fluid of the invention can be utilized in combination with a rheology modifier (thickener) to enhance the yield value of a thickened liquid. In one aspect, the yield stress fluid of the invention can be combined with a nonionic rheology modifier which rheology modifier when utilized alone does not have a sufficient yield stress value. Any rheology modifier is suitable, so long as such is soluble in water, stable and contains no ionic or ionizable groups. Suitable rheology modifiers include, but are not limited to natural gums (e.g., polygalactomannan gums selected from fenugreek, cassia, locust bean, tara and guar), modified cellulose (e.g., ethylhexylethylcellulose (EHEC), hydroxybutylmethylcellulose (HBMC), hydroxyethylmethylcellulose (NEMC), hydroxypropylmethylcellulose (HPMC), methyl cellulose (MC), hydroxyethylcellulose (HEC), hydroxypropylcellulose (HPC) and cetyl hydroxyethylcellulose); and mixtures thereof methylcellulose, polyethylene glycols (e.g., PEG 4000, PEG 6000, PEG 8000, PEG 10000, PEG 20000), polyvinyl alcohol, polyacrylamides (homopolymers and copolymers), and hydrophobically modified ethoxylated urethanes (HEUR). The rheology modifier can be utilized in an amount ranging from about 0.5 to about 25 wt. % in one aspect, from about 1 to about 15 wt. % in another aspect, and from about 2 to about 10 wt. % in a further aspect, based on the weight of the total weight of the composition.

The yield stress fluids of the invention can be used in any application requiring yield stress properties. The yield stress fluids can be used alone or in combination with other fluids to enhance the yield stress values thereof.

In one embodiment, the yield stress fluids of the invention can be utilized to suspend particulate materials and insoluble droplets within an aqueous composition. Such fluids are useful in the oil and gas, personal care, and homecare industries.

In the oil and gas industry, the yield stress fluids of the invention can be used to enhance the yield stress value of drilling and hydraulic fracturing fluids, and can be employed to suspend borehole cuttings and fracturing proppants such as, for example, sand, sintered bauxite, glass balls, ceramic materials, polystyrene beads, and the like.

In the personal care industry, the yield stress fluids of the invention can be utilized to improve the yield stress properties of detersive compositions, hair and skin care compositions, as well as cosmetics, and can be utilized to suspend insoluble silicones, opacifiers and pearlescent agents (e.g., mica, coated mica), pigments, exfoliants, anti-dandruff agents, clay, swellable clay, laponite, gas bubbles, liposomes, microsponges, cosmetic beads, cosmetic microcapsules, and flakes. The yield stress fluids of the invention can stabilize these materials in suspension for at least one month at 23° C. in one aspect, at least 6 months in another aspect, and at least one year in a further aspect.

The stable compositions maintain a smooth, acceptable rheology with good shear thinning properties without significant increases or decreases in viscosity, with no phase separation, e.g., settling or creaming out (rising to the surface), or loss of clarity over extended periods of time, such as for at least one month at 45° C.

Exemplary bead components include, but are not limited to, agar beads, alginate beads, jojoba beads, gelatin beads, Styrofoam™ beads, polyacrylate, polymethylmethacrylate (PMMA), polyethylene beads, Unispheres™ and Unipearls™ cosmetic beads (Induchem USA, Inc., New York, N.Y.), Lipocapsule™, Liposphere™, and Lipopearl™ microcapsules (Lipo Technologies Inc., Vandalia, Ohio), and Confetti II™ dermal delivery flakes (United-Guardian, Inc., Hauppauge, N.Y.). Beads can be utilized as aesthetic materials or can be used to encapsulate benefit agents to protect them from the deteriorating effects of the environment or for optimal delivery, release and performance in the final product.

In one aspect, the cosmetic beads range in size from about 0.5 to about 1.5 mm. In another aspect, the difference in specific gravity of the bead and water is between about +/−0.01 and 0.5 in one aspect and from about +/−0.2 to 0.3 g/ml in another aspect.

In one aspect, the microcapsules range in size from about 0.5 to about 300 μm. In another aspect, the difference in specific gravity between the microcapsules and water is from about +/−0.01 to 0.5. Non-limiting examples of microcapsule beads are disclosed in U.S. Pat. No. 7,786,027, the disclosure of which is herein incorporated by reference.

In one aspect of the invention, the amount of particulate component and/or insoluble droplets can range from about 0.1% to about 10% by weight based on the total weight of the composition.

While overlapping weight ranges for the various components and ingredients that can be contained in the yield stress fluids of the invention have been expressed for selected embodiments and aspects of the invention, it should be readily apparent that the specific amount of each component in the compositions will be selected from its disclosed range such that the amount of each component is adjusted so that the sum of all components in the composition will total 100 weight percent. The amounts employed will vary with the purpose and character of the desired product and can be readily determined by one skilled in the formulation art and from the literature.

This invention is illustrated by the following examples that are merely for the purpose of illustration and are not to be regarded as limiting the scope of the invention or the manner in which it can be practiced. Unless specifically indicated otherwise, parts and percentages are given by weight.

Test Methodology
Yield Stress

The yield stress of these samples are determined by oscillatory and steady shear measurements on a controlled stress rheometer (TA Instruments AR1000N rheometer, New Castle, Del.) with cone and plate geometry (40 mm cone with a cone angle of 2 degrees and 56 µm gap) at 25° C. The oscillatory measurements are performed at a fixed frequency ranging from 1 Hz to 0.001 Hz. The elastic and viscous moduli (G' and G" respectively) are obtained as a function of increasing stress amplitude. In cases where the swollen polymer particles created a jammed network, G' is larger than G" at low stress amplitudes but decreases at higher amplitudes crossing G" because of rupture of the network. The stress corresponding to the crossover of G' and G" is noted as the yield stress.

Viscosity (Brookfield Method)

Brookfield rotating spindle method (all viscosity measurements reported herein are conducted by the Brookfield method whether mentioned or not): The viscosity measurements are calculated in mPa·s, employing a Brookfield rotating spindle viscometer, Model RVT (Brookfield Engineering Laboratories, Inc.), at about 20 revolutions per minute (rpm), at ambient room temperature of about 20 to 25° C. (hereafter referred to as viscosity). Spindle sizes are selected in accordance with the standard operating recommendations from the manufacturer. Generally, spindle sizes are selected as follows:

| Spindle Size No. | Viscosity Range (mPa · s) |
| --- | --- |
| 1 | 1-50 |
| 2 | 500-1,000 |
| 3 | 1,000-5,000 |
| 4 | 5,000-10,000 |
| 5 | 10,000-20,000 |
| 6 | 20,000-50,000 |
| 7 | >50,000 |

The spindle size recommendations are for illustrative purposes only. The artisan of ordinary skill in the art will select a spindle size appropriate for the system to be measured.

Turbidity

The turbidity (clarity) of a composition is determined in Nephelometric Turbidity Units (NTU) employing a nephelometric turbidity meter (Mircro 100 Turbidimeter, HF Scientific, Inc.) at ambient room temperature of about 20 to 25° C. Distilled water (NTU=0) is utilized as a standard. Six dram screw cap vials (70 mm×25 mm) are filled almost to the top with test sample and centrifuged at 100 rpm until all bubbles are removed. Upon centrifugation, each sample vial is wiped with tissue paper to remove any smudges before placement in the turbidity meter. The sample is placed in the turbidity meter and a reading is taken. Once the reading stabilizes the NTU value is recorded. The vial is given one-quarter turn and another reading is taken and recorded. This is repeated until four readings are taken. The lowest of the four readings is reported as the turbidity value. A turbidity value of ≤00 NTU in one aspect, ≤75 NTU in another aspect, ≤50 NTU in still another aspect, ≤30 NTU in a further aspect, ≤15 NTU in a still further aspect, and ≤10 NTU in an additional aspect is considered clear.

Suspension Stability

The ability of a polymer system to suspend active and/or aesthetically pleasing insoluble oily, gaseous and particulate materials is important from the standpoint of product efficacy and appeal. Suspension stability is evaluated by the ability of a polymer containing surfactant composition to suspend (without settling or creaming) 1.2 mm sized beads with specific gravity of approximately 1.4 (Unisphere™ REL 552 from Induchem AG, Switzerland) over selected period of time. A six dram vial (approximately 70 mm high×25 mm in diameter) is filled to the 50 mm point with each formulation. The beads are weighed into each sample (0.6 wt. % based on the weight of the total formulation) and stirred gently with a wooden spatula until the beads are uniformly dispersed throughout each sample. The vials are placed on a lab bench at ambient room temperature to age over a four week or 16 week period. The bead suspension property of each sample is monitored on a daily basis. The suspension results are visually observed over the four week or 16 week test period. The compositions are visually rated on a pass/fail basis. If the beads remain suspended (do not rise or settle) in the test formulation, the composition passes. If the beads settle to the bottom or rise to the top (creaming) of the vial containing the test formulation, the composition fails.

The following abbreviations and trade names are utilized in the examples.

| Abbreviations | |
| --- | --- |
| Abex ™ 2545 Nonionic Surfactant | Ethoxylated alcohol containing a proprietary hydrophobic moiety having an HLB range of 17.5-19.0, Rhodia Group. |
| APE | Allyl Pentaerythritol (crosslinker) |
| BA | n-Butyl Acrylate |
| Bruggolite ™ FF-6 Reducing Agent | A mixture of the disodium salt of 2-hydroxy-2-sulfinatoacetate, the disodium salt of 2-hydroxy-2-sulfonatoacetate and sodium sulfite (commercially available from Brüggemann Chemical US) |
| Chembetaine ™ BW Amphoteric Surfactant | Alkyl Betaine (AB)—Blend of Lauryl Betaine and Myristyl Betaine (43% active), Lubrizol Advanced Materials, Inc |
| Chembetaine ™ CAD Amphoteric Surfactant | Cocamidopropyl Betaine (CAPB) (35% active), Lubrizol Advanced Materials, Inc. |
| DVB | Divinyl Benzene (crosslinker) |
| EA | Ethyl Acrylate |
| NVP | N-Vinylpyrrolidone |
| MBAM | N,N'-Methylenebisacrylamide (crosslinker) |
| Sulfochem ™ ALS anionic surfactant | Ammonium Lauryl Sulfate (ALS), (30% active) Lubrizol Advanced Materials, Inc. |
| Sulfochem ™ EA-1 | Sodium Laureth Sulfate—1 mole of ethoxylation (anionic ethoxylated surfactant) (26% active), Lubrizol Advanced Materials, Inc. |
| Sulfochem ™ EA-2 | Sodium Laureth Sulfate—2 moles of ethoxylation (anionic surfactant) (26% active), Lubrizol Advanced Materials, Inc. |
| Sulfochem ™ AOS-K Surfactant | Sodium C14-C16 Olefin Sulfonate (38-40% active), Lubrizol Advanced Materials, Inc. |
| Sulfochem ™ SLS | Sodium Lauryl Sulfate (SLS) (anionic surfactant) (30% active), Lubrizol Advanced Materials, Inc. |

| Abbreviations | |
|---|---|
| TBHP | tert-Butyl Hydroperoxide |
| TMPTA | Trimethylolpropane Triacrylate (crosslinker) |
| VA | Vinyl Acetate |
| VA-10 | Vinyl Decanoate |

EXAMPLE 1

An emulsion polymer prepared from a monomer mixture comprising 100 wt. % VA and crosslinked with APE (0.291 wt. % based on the weight of the dry polymer) is synthesized as follows.

A monomer premix is made by mixing 140 grams of water, 16.67 grams of Sulfochem™ sodium lauryl sulfate (SLS) surfactant, 1.0 gram of sodium acetate, 498.72 grams of VA and 1.43 grams of APE. Oxidant A is made by mixing 2.86 grams of 70% TBHP in 40 grams of water. Reductant A is prepared by dissolving 0.13 grams of erythorbic acid in 5 grams of water. Reductant B is prepared by dissolving 2.0 grams of erythorbic acid in 100 grams of water. A 3-liter reaction vessel is charged with 700 grams of water, 20 grams of 50% Abex™ 2545 nonionic surfactant, and 8.33 grams of SLS. The contents of the reaction vessel are heated to 60° C. under a nitrogen blanket with gentle agitation. Oxidant A is added to the reaction vessel followed by the addition of reductant A. After 2 minutes the monomer premix is metered into the reaction vessel over a period of 180 minutes. About 2 minutes after the start of the monomer premix metering, reductant B is metered into the reaction vessel over a period of 210 minutes. After the completion of monomer premix feed, 33 grams of water is used to flush the residual contents of the premix vessel into the reaction vessel. After completion of the reductant B feed, the temperature of the reaction vessel contents is maintained at 60° C. for 60 minutes. The contents of reaction vessel are then cooled to 55° C. An oxidant solution of 1.79 grams of 70% TBHP, 0.17 grams of SLS and 25 grams of water is added to the reaction vessel. After 5 minutes, a solution of 0.75 grams of Bruggolite™ FF6 reductant in 25 grams of water is added to the reaction vessel. The reaction mixture is maintained at 55° C. After 30 minutes, an oxidant solution of 1.79 grams of 70% TBHP and 0.17 grams of SLS in 25 grams of water is added to the reaction vessel. After 5 minutes, a solution of 0.75 grams of Bruggolite™ FF-6 reductant, 133 grams of SLS in 25 grams of water is added to the reaction vessel. The reaction vessel is maintained at 55° C. for about 30 minutes. The reaction vessel is cooled to room temperature and the polymer emulsion is filtered through a 100 micron filter cloth. The pH of the filtered emulsion is adjusted to 4.6 with ammonium hydroxide. The emulsion contains 28.5 wt. % polymer solids having an average particle size 75 nm. The viscosity of the emulsion is 7 cps.

EXAMPLE 2

An emulsion polymer prepared from a monomer mixture comprising 100 wt. % VA and crosslinked with APE (0.291 wt. % based on the weight of the dry polymer) is synthesized as follows.

A monomer premix is made by mixing 140 grams of water, 5 grams of Sulfochem™ sodium lauryl sulfate (SLS) surfactant, 1.0 grams of sodium acetate, 499.0 grams of VA and 1.43 grams of APE. Oxidant A is prepared by mixing 2.86 grams of 70% TBHP in 40 grams of water. Reductant A is prepared by dissolving 0.15 grams of erythorbic acid in 5 grams of water. Reductant B is prepared by dissolving 2.0 grams of erythorbic acid in 100 grams of water. A 3-liter reactor vessel is charged with 700 grams of water, 30 grams of 50% Abex™ 2545 nonionic surfactant, and 8.33 grams of SLS. The contents are heated to 60° C. under a nitrogen blanket with gentle agitation. Oxidant A is added to the reaction vessel followed by the addition of reductant A. After 2 minutes the monomer premix is metered into the reaction vessel over a period of 180 minutes. About 2 minutes after the start of the monomer premix feed, reductant B is metered into the reaction vessel over a period of 210 minutes. After the completion of monomer premix feed, 33 grams of water is used to flush the residual contents of the premix vessel into the reaction vessel. After completion of the reductant B feed, the temperature of the reaction vessel contents is maintained at 60° C. for 60 minutes. The reaction vessel contents are then cooled to 55° C. An oxidant solution of 1.79 grams of 70% TBHP, 0.17 grams of SLS in 25 grams of water is added to the reaction vessel. After 5 minutes, a solution of 0.75 grams of Bruggolite™ FF6 reductant in 25 grams of water is added to the reaction vessel. The temperature of the reaction vessel is maintained at 55° C. After 30 minutes, an oxidant solution of 1.79 grams of 70% TBHP, 0.17 grams of SLS in 25 grams of water is added to the reaction vessel. After 5 minutes, a solution of 0.75 grams of Bruggolite™ FF6 reductant in 25 grams of water is added to the reaction vessel. The reaction vessel is maintained at 60° C. for about 30 minutes. The reaction vessel is cooled to room temperature and the polymer emulsion is filtered through a 100 micron filter cloth. The pH of the filtered emulsion is adjusted to 4.1 with ammonium hydroxide. The emulsion contains 29.0 wt. % polymer solids having an average particle size 104 nm. The viscosity of the emulsion is 7 cps.

EXAMPLE 3

An emulsion polymer prepared from a monomer mixture comprising 95 wt. % VA and 5 wt. % NVP and crosslinked with APE (0.291 wt. % based on the weight of the dry polymer) is synthesized by the process of Example 1, except that 473 grams of VA, 15 grams of NVP and 1.43 grams of APE are utilized in the monomer premix. The polymer emulsion has a 29.3 wt. % polymer solids content, a viscosity of 7 cps, and a particle size of 82 nm.

EXAMPLE 4

An emulsion polymer prepared from a monomer mixture comprising 90 wt. % VA, 10 wt. % NVP, crosslinked with APE (0.15 wt. % based on the weight of the dry polymer) as follows.

A monomer premix is made by mixing 62.5 grams of water, 8.33 grams of Sulfochem™ sodium lauryl sulfate (SLS) surfactant, 223.13 grams of VA, 25 grams of NVP and 1.43 grams of a mixture of 20 wt. % APE and 80 wt. % vinyl acetate. Reductant A is prepared by dissolving 1 gram of erythorbic acid in 20 grams of water. Oxidant A was made by mixing 1.43 grams of 70% TBHP, 0.22 grams of SLS in 50 grams of water. A 1-liter reactor vessel is charged with 375 grams of water, 10 grams of 50% Abex™ 2545 nonionic surfactant, and 4.17 grams of SLS. The contents are heated to 68° C. under a nitrogen blanket with gentle agitation. Reductant A is then added to the reaction vessel. After about 2 minutes, Oxidant A is metered into the reaction vessel over a period of 210 minutes. About 2 minutes after the start of the oxidant A feed, the monomer premix is metered into the reaction vessel over a period of 180 minutes. After the premix feed is completed, 16.5 grams of water is used to flush the residual contents of the premix vessel into the reaction vessel. After completion of the oxidant A feed, the temperature of the reaction vessel contents is maintained at 68° C. for 60 minutes. The contents of the reaction vessel are the cooled to 55° C. An oxidant solution of 0.89 grams of 70% TBHP, 0.08 grams of SLS in 12.5 grams of water is added to the reaction vessel. After 5 minutes, a reductant solution of 0.75 grams of erythorbic acid in 12.5 grams of water is added to the reaction vessel. The temperature of the reaction vessel contents is maintained at 55° C. After 30 minutes, an oxidant solution of 0.89 grams of 70% TBHP, 0.08 grams of SLS in 12.5 grams of water is added to the reaction vessel. After 5 minutes, a reductant solution of 0.75 grams of erythorbic acid in 12.56 grams of water is added to the reaction vessel. The temperature of the reaction vessel is maintained at 55° C. for about 30 minutes. The contents of the reaction vessel are cooled to room temperature and the polymer emulsion is filtered through 100 micron filter cloth. The pH of the resulting emulsion is adjusted to 4.5 with ammonium hydroxide. The emulsion has a polymer solids content of 28.7 wt. % with an average particle size of 112 nm.

EXAMPLE 5

An emulsion polymer prepared from a monomer mixture comprising 70 wt. % VA, 5 wt. % BA, and 15 wt. % EA crosslinked with APE (0.251 wt. % based on the weight of the dry polymer) is synthesized as follows.

A monomer premix is made by mixing 62.5 grams of water, 8.33 grams of Sulfochem™ sodium lauryl sulfate (SLS) surfactant, 171.88 grams of VA, 25 grams of NVP, 12.5 grams of BA, 37.5 grams of EA, and 3.13 grams of a mixture of 20 wt. % APE and 80 wt. % VA. Reductant A is prepared by dissolving 1 gram of Bruggolite™ FF6 reductant in 20 grams of water. Oxidant A is made by mixing 1.43 grams of 70% TBHP, 0.22 grams of SLS in 50 grams of water. A 1-liter reactor vessel is charged with 375 grams of water, 15 grams of 50% Abex™ 2545 nonionic surfactant, and 4.17 grams of SLS. The contents of the reactor are heated to 68° C. under a nitrogen blanket with gentle agitation. Reductant A is then added to the reaction vessel. After about 2 minutes, oxidant A is metered into the reaction vessel over a period of 210 minutes. About 2 minutes after the start of the oxidant A feed, the monomer premix is metered into the reaction vessel over a period of 180 minutes. After the premix feed is completed, 16.5 grams of water is used to flush the residual contents of the premix vessel into the reaction vessel. After completion of the oxidant A feed, the temperature of the reaction vessel in maintained at 68° C. for 60 minutes. The contents of the reaction vessel are then cooled to 55° C. A solution of 0.89 grams of 70% TBHP, 0.08 grams of SLS in 12.5 grams of water is added to the reaction vessel. After 5 minutes, a solution of 0.38 grams of Bruggolite™ FF6 reductant in 12.5 grams of water is added to the reaction vessel. The reaction vessel is maintained at 55° C. After 30 minutes, a solution of 0.89 grams of 70% TBHP and 0.08 grams of SLS in 12.5 grams of water was added to the reaction vessel. After 5 minutes, a solution of 0.38 grams of Bruggolite™ FF6 reductant in 12.56 grams of water was added to the reaction vessel. The reaction vessel was maintained at 55° C. for about 30 minutes. The contents of the reaction vessel are cooled to room temperature and the emulsion polymer is filtered through 100 micron filter cloth. The pH of the resulting emulsion is 5. The emulsion has a polymer solids content of 29.9 wt. % with an average particle size 172 nm and a viscosity of 8 cps.

EXAMPLE 6

An emulsion polymer prepared from a monomer mixture comprising 70 wt. % VA, 20 wt. % EA, and 10 wt. % NVP and crosslinked with APE (0.251 wt. % based on the weight of the dry polymer) is synthesized by the process of Example 4, except that 174.38 grams of VA, 50 grams of EA, 25 grams of NVP and 3.13 grams of a mixture of 20 wt. % APE and 80 wt. % VA are utilized in the monomer premix. The polymer emulsion has a 29.0 wt. % polymer solids content with an average particle size of 170 nm and a viscosity of 7 cps.

EXAMPLE 7

An emulsion polymer prepared from a monomer mixture comprising 70 wt. % VA, 20 wt. % BA, and 10 wt. % NVP crosslinked with APE (0.251 wt. % based on the weight of the dry polymer) is synthesized as follows.

A monomer premix is made by mixing 62.5 grams of water, 6.25 grams of Sulfochem™ AOS-K surfactant (AOS), 171.88 grams of VA, 25 grams of NVP, 50 grams of BA, and 3.13 grams of a mixture of 20 wt. % APE and 80 wt. % vinyl acetate. Reductant A is prepared by dissolving 1 gram of Bruggolite™ FF6 reducing agent in 20 grams of water. Oxidant A is made by mixing 1.43 grams of 70% TBHP, 0.16 grams of AOS in 50 grams of water. A 1-liter reactor vessel is charged with 375 grams of water, 15 grams of 50% Abex™ 2545 nonionic surfactant and 3.13 grams of AOS. The contents of the reactor are heated to 68° C. under a nitrogen blanket with gentle agitation. Reductant A is then added to the reaction vessel. After 2 minutes, oxidant A is metered into the reaction vessel over a period of 210 minutes. About 2 minutes following the start of Initiator A feed, the monomer premix is metered into the reaction vessel over a period of 180 minutes. After the premix feed is completed, 16.5 grams of water is used to flush the residual contents of the premix vessel into the reaction vessel. After completion of the oxidant A feed, the temperature of the reaction vessel is maintained at 68° C. for 60 minutes. The contents of the reaction vessel are then cooled to 55° C. A solution of 0.89 grams of 70% TBHP, 0.08 grams of AOS in 12.5 grams of water is added to the reaction vessel. After 5 minutes, a solution of 0.38 grams of Bruggolite FF-6 in 12.5 grams of water was added to the reaction vessel. The reaction vessel was maintained at 55° C. After 30 minutes, a solution of 0.89 grams of 70% TBHP and 0.08 grams of 40% AOS in 12.5 grams of water was added to the reaction vessel. After 5 minutes, a solution of 0.38 grams of Bruggolite™ FF6 reductant in 12.56 grams of water is added to the reaction vessel. The reaction vessel is maintained at 55° C. for about 30 minutes. The contents of the reaction vessel are cooled to room temperature, and then the polymer emulsion is filtered through 100 micron filter cloth. The pH of the resulting emulsion is 5.25. The emulsion has a polymer solids content of 27.7 wt. % with an average particle size of 88 nm.

EXAMPLE 8

An emulsion polymer prepared from a monomer mixture comprising 70 wt. % VA, 20 wt. % VA-10, and 10 wt. %

NVP and crosslinked with APE (0.251 wt. % based on the weight of the dry polymer) is synthesized by the process of Example 5, except that 171.88 grams of VA, 50 grams of VA-10, 25 grams of NVP and 3.13 grams of a mixture of 20 wt. % APE and 80 wt. % VA are utilized in the monomer premix. The polymer emulsion has a pH of 5.1, a 28.6 wt. % polymer solids content with an average particle size of 104 nm, and a viscosity of 7 cps.

EXAMPLE 9 (Comparative)

A linear emulsion polymer (no crosslinker) prepared from a monomer mixture comprising 100 wt. % VA is synthesized as follows.

A 1-liter reactor vessel is charged with 649.7 grams of water, 150 grams of VA, 8.7 grams of 10% (actives) sodium dodecyl sulfate, 14.5 grams of 2% sodium bicarbonate, and 8.6 grams of 5% potassium persulfate initiator. The contents of the reactor are heated to 40° C. under a nitrogen blanket with gentle agitation. After holding at 40° C. for 18 hours, the reaction temperature is raised to 90° C. After holding at 90° C. for 4 hours, the contents of the reaction vessel are cooled to room temperature, and then the polymer emulsion is filtered through a 100 micron filter cloth. The emulsion has a polymer solids content of 18.2 wt. % with an average particle size 154 nm, a pH of 3.7, and viscosity of 4 cps.

EXAMPLE 10 (Comparative)

An emulsion polymer prepared from a monomer mixture comprising 100 wt. % VA and crosslinked with DVB (0.04 wt. % based on the weight of the dry polymer) is synthesized as set forth in Comparative Example 9, except that the monomer composition used in the premix contains 150 grams of VA, and 0.098 grams of 55% DVB. The emulsion has a polymer solids content of 16.4 wt. % with an average particle size of 94 nm, a pH of 3.5, and a viscosity of 4 cps.

EXAMPLES 11 (Comparative)

An emulsion polymer prepared from a monomer mixture comprising 100 wt. % VA and crosslinked with APE (0.291 wt. % based on the weight of the dry polymer) is synthesized as follows.

A monomer premix is made by mixing 140 grams of water, 3 grams of 50% Abex™ 2545 nonionic surfactant, 1.0 gram of sodium acetate, 499 grams of VA and 1.43 grams of APE. Reductant A is made by mixing 2 grams of erythorbic acid in 40 grams of water. Oxidant A is prepared by dissolving 0.25 grams of ammonium persulfate in 5 grams of water. Oxidant B is prepared by dissolving 2.0 grams of ammonium persulfate in 100 grams of water. A 3-liter reactor vessel is charged with 800 grams of water and 20 grams of 50% Abex™ 2545 nonionic surfactant. The contents of the reactor are heated to 60° C. under a nitrogen blanket with gentle agitation. Reductant A is then added to the reaction vessel followed by the addition of oxidant A. After about 1 minute, the monomer premix is metered into the reaction vessel over a period of 150 minutes. About 2 minutes after the commencement of the monomer premix feed, oxidant B is metered into the reaction vessel over a period of 180 minutes. After the premix feed is completed, 33 grams of water is used to flush the residual contents of the premix vessel into the reaction vessel. After completion of the oxidant B feed, the temperature of the reaction vessel is raised to 65° C. for 60 minutes. The reaction vessel is then cooled to 55° C. A solution of 1.79 grams of 70% TBHP, 0.17 grams of SLS in 25 grams of water is added to the reaction vessel. After 5 minutes, a solution of 0.75 grams of Bruggolite™ FF6 reducing agent in 25 grams of water is added to the reaction vessel. The reaction vessel is maintained at 55° C. After 30 minutes, a solution of 1.79 grams of 70% TBHP, 0.17 grams of SLS in 25 grams of water is added to the reaction vessel. After 5 minutes, a solution of 0.75 grams of erythorbic acid reductant in 25 grams of water is added to the reaction vessel. The contents of the reaction vessel are maintained at 55° C. for about 30 minutes. The reaction vessel is cooled to room temperature and the polymer emulsion is filtered through 100 micron filter cloth. The pH of the resulting emulsion is adjusted to 4.6 with ammonium hydroxide. The emulsion has a polymer solids content of 29.4 wt. % with an average particle size 113 nm, and a viscosity of 7 cps.

EXAMPLE 12 (Comparative)

An emulsion polymer prepared from a monomer mixture comprising 70 wt. % VA, 20 wt. % EA, 10 wt. % NVP and crosslinked with MBAM (0.251 wt. % based on the weight of the dry polymer) is synthesized as set forth in Example 4, except that the monomer composition used in the premix contains 174.38 grams of VA, 50 grams of EA, 25 grams of NVP, and 0.63 grams of the crosslinking monomer MBAM. The emulsion has a polymer solids content of 26.6 wt. % with an average particle size of 298 nm, a pH of 5, and a viscosity of 9 cps.

EXAMPLE 13 (Comparative)

An emulsion polymer prepared from a monomer mixture comprising 70 wt. % VA, 20 wt. % EA, 10 wt. % NVP and crosslinked with TMPTA (0.251 wt. % based on the weight of the dry polymer) is synthesized as set forth in Example 4, except that the monomer composition used in the premix contains 174.38 grams of VA, 50 grams of EA, 25 grams of NVP, and 0.63 grams of TMPTA. The emulsion has a polymer solids content of 29.4 wt. % with an average particle size of 195 nm, a pH of 5, and a viscosity of 7 cps.

Table 1 summarizes the monomer constituents utilized in the emulsion polymerization examples set forth above.

TABLE 1

| Ex No. | VA (wt. %) | BA (wt. %) | EA (wt. %) | NVP (wt. %) | VA-10 (wt. %) | APE[1] | DVB[1] | MBAM[1] | TMPTA[1] |
|---|---|---|---|---|---|---|---|---|---|
| 1 | 100 | — | — | — | — | 0.291 | — | — | — |
| 2 | 100 | — | — | — | — | 0.291 | — | — | — |
| 3 | 95 | — | — | 5 | — | 0.291 | — | — | — |
| 4 | 90 | — | — | 10 | — | 0.150 | — | — | — |
| 5 | 70 | 5 | 15 | 10 | — | 0.251 | — | — | — |
| 6 | 70 | — | 20 | 10 | — | 0.251 | — | — | — |
| 7 | 70 | 20 | — | 10 | — | 0.251 | — | — | — |

TABLE 1-continued

| Ex No. | VA (wt. %) | BA (wt. %) | EA (wt. %) | NVP (wt. %) | VA-10 (wt. %) | APE[1] | DVB[1] | MBAM[1] | TMPTA[1] |
|---|---|---|---|---|---|---|---|---|---|
| 8 | 70 | — | — | 10 | 20 | 0.251 | — | — | — |
| 9[2] | 100 | — | — | — | — | — | — | — | — |
| 10[2] | 100 | — | — | — | — | — | 0.040 | — | — |
| 11[2] | 100 | — | — | — | — | 0.291 | — | — | — |
| 12[2] | 70 | — | 20 | 10 | — | — | — | 0.251 | — |
| 13[2] | 70 | — | 20 | 10 | — | — | — | — | 0.251 |

[1]Weight percentage based on dry polymer weight
[2]Comparative example

EXAMPLE 14

This example investigates the effect of pH on the yield stress value, viscosity and turbidity of non-ethoxylated anionic (SLS)/amphoteric (CAPB) surfactant blends containing the vinyl acetate homopolymer prepared by the process of Example 1. Samples containing 3 wt. % polymer solids and a surfactant blend of 14 wt. % SLS and 3 wt. % CAPB in deionized (D.I.) water (q.s. to 100 wt. %) are prepared. The pH of these samples is adjusted to values ranging from about 3 to about 13 using dilute aqueous solutions of sodium hydroxide (18% wt./wt.) or citric acid (50% wt./wt.). The yield stress (at a frequency of 1 Hz), Brookfield viscosity (BV) and turbidity properties for each pH value is measured in accordance with the test methodology described above. The results are given in Table 2.

TABLE 2

| Polymer Ex. (wt. %) | SLS[1] (wt. %) | CAPB[2] (wt. %) | pH | Yield Stress (Pa) | BV (mPa·s) | Turbidity (NTU) |
|---|---|---|---|---|---|---|
| 3 | 14 | 3 | 3.3 | 16.2 | 7260 | 29.4 |
| 3 | 14 | 3 | 4.1 | 28.5 | 11600 | 29.4 |
| 3 | 14 | 3 | 5.4 | 30.9 | 14480 | 32.8 |
| 3 | 14 | 3 | 6.6 | 38.0 | 13900 | 32.2 |
| 3 | 14 | 3 | 7.1 | 23.4 | 9520 | 27.7 |
| 3 | 14 | 3 | 8.0 | 22.7 | 11240 | 29.0 |
| 3 | 14 | 3 | 9.0 | 15.9 | 8520 | 26.6 |
| 3 | 14 | 3 | 10.0 | 16.7 | 7080 | 22.8 |
| 3 | 14 | 3 | 11.5 | 14.5 | 6480 | 22.8 |
| 3 | 14 | 3 | 13.1 | 13.1 | 5640 | 22.1 |

[1]Sulfochem™ SLS anionic surfactant
[2]Chembetaine™ CAD amphoteric surfactant

The results demonstrate that a surfactant chassis containing a non-ethoxylated anionic surfactant in combination with an amphoteric surfactant when formulated with a VA rich homopolymer prepared by the process of the invention gives good clarity and yield stress properties across a broad pH range without a significant increase in viscosity.

EXAMPLE 15

This example investigates the effect of pH on the yield stress value, viscosity and turbidity of non-ethoxylated anionic (SLS)/amphoteric (CAPB) surfactant blends containing the vinyl acetate/vinyl pyrrolidone copolymer prepared by the process of Example 3. Samples containing the copolymer of Example 3 are prepared as in Example 14. The pH of these samples is adjusted to values ranging from about 3 to about 13 using dilute aqueous solutions of sodium hydroxide (18% wt./wt.) or citric acid (50% wt./wt.). The yield stress (frequency of 1 Hz), Brookfield viscosity (BV) and turbidity properites for each pH value is measured in accordance with the test methodology described above. The results are given in Table 3.

TABLE 3

| Polymer Ex. 3 (wt. %) | SLS[1] (wt. %) | CAPB[2] (wt. %) | pH | Yield Stress (Pa) | BV (mPa·s) | Turbidity (NTU) |
|---|---|---|---|---|---|---|
| 3 | 14 | 3 | 3.5 | 7.3 | 3200 | 12.8 |
| 3 | 14 | 3 | 4.5 | 10.2 | 5100 | 12.5 |
| 3 | 14 | 3 | 5.4 | 12.5 | 6440 | 13.6 |
| 3 | 14 | 3 | 6.8 | 12.4 | 6500 | 14.0 |
| 3 | 14 | 3 | 7.7 | 12.1 | 5800 | 13.1 |
| 3 | 14 | 3 | 8.6 | 12.2 | 5920 | 13.4 |
| 3 | 14 | 3 | 9.3 | 12.2 | 5820 | 13.5 |
| 3 | 14 | 3 | 10.1 | 11.7 | 6480 | 14.1 |
| 3 | 14 | 3 | 11.1 | 9.4 | 4880 | 12.8 |
| 3 | 14 | 3 | 12.9 | 10.7 | 5020 | 12.4 |

[1]Sulfochem™ SLS anionic surfactant
[2]Chembetaine™ CAD amphoteric surfactant

The results demonstrate that a surfactant chassis containing a non-ethoxylated anionic surfactant in combination with an amphoteric surfactant when formulated with a VA rich copolymer prepared by the process of the invention gives good clarity and yield stress properties across a broad pH range.

EXAMPLE 16

This example investigates the effect of pH on the yield stress value, viscosity and turbidity of ethoxylated anionic (SLES-1)/amphoteric (CAPB) surfactant blends containing the vinyl acetate/vinyl pyrrolidone copolymer prepared by the process of Example 3. Samples containing the copolymer of Example 3 are similarly prepared as in Example 15, except that the non-ethoxylated (SLS) surfactant is replaced by an ethoxylated (SLES-1) surfactant. The pH of these samples is adjusted to values ranging from about 3 to about 13 using dilute aqueous solutions of sodium hydroxide (18% wt./wt.) or citric acid (50% wt./wt.). The yield stress (at a frequency of 1 Hz), Brookfield viscosity (BV) and turbidity values for each pH value is measured in accordance with the test methodology described above. The results are given in Table 4.

TABLE 4

| Polymer Ex. 3 (wt. %) | SLES-1[1] (wt. %) | CAPB[2] (wt. %) | pH | Yield Stress (Pa) | BV (mPa·s) | Turbidity (NTU) |
|---|---|---|---|---|---|---|
| 3 | 14 | 3 | 3.4 | 8.7 | 4600 | 18.7 |
| 3 | 14 | 3 | 4.2 | 11.6 | 6720 | 17.0 |
| 3 | 14 | 3 | 5.1 | 11.8 | 8260 | 15.7 |
| 3 | 14 | 3 | 6.3 | 12.8 | 9300 | 16.7 |
| 3 | 14 | 3 | 7.1 | 11.3 | 7020 | 16.8 |
| 3 | 14 | 3 | 8.3 | 12.4 | 6980 | 16.6 |
| 3 | 14 | 3 | 9.2 | 10.6 | 5520 | 16.6 |
| 3 | 14 | 3 | 10.7 | 9.9 | 5600 | 16.3 |

TABLE 4-continued

| Polymer Ex. 3 (wt. %) | SLES-1[1] (wt. %) | CAPB[2] (wt. %) | pH | Yield Stress (Pa) | BV (mPa·s) | Turbidity (NTU) |
|---|---|---|---|---|---|---|
| 3 | 14 | 3 | 11.5 | 9.5 | 6100 | 16.1 |
| 3 | 14 | 3 | 12.6 | 9.1 | 4700 | 15.4 |

[1]Sulfochem ™ EA-1 ethoxylated anionic surfactant
[2]Chembetaine ™ CAD amphoteric surfactant The results demonstrate that a surfactant chassis containing an ethoxylated anionic surfactant in combination with an amphoteric surfactant when formulated with VA rich copolymer prepared by the process of the invention gives good clarity and yield stress properties across a broad pH range.

EXAMPLE 17

This example investigates the effect of an amphoteric surfactant (CAPB) on the yield stress (at a frequency of 1 Hz), viscosity and turbidity of surfactant compositions containing a non-ethoxylated anionic (SLS) surfactant and an ethoxylated anionic (SLES) surfactant in deionized (D.I.) water (q.s. to 100 wt. %). The surfactant blends are formulated with the polymer prepared by the process of Example 7. The results are shown in Table 5.

TABLE 5

| Polymer Ex. 7 (wt. %) | SLS[1] (wt. %) | CAPB[2] (wt. %) | Yield Stress (Pa) | BV (mPa·s) | Turbidity (NTU) |
|---|---|---|---|---|---|
| 3 | 14 | 0 | 1.5 | 800 | 23.1 |
| 3 | 14 | 3 | 8.1 | 3700 | 14.0 |

| Polymer Ex. 7 (wt. %) | SLES-1[3] (wt. %) | CAPB[2] (wt. %) | Yield Stress (Pa) | BV (mPa·s) | Turbidity (NTU) |
|---|---|---|---|---|---|
| 3 | 14 | 0 | 1.2 | 760 | 20.5 |
| 3 | 14 | 3 | 7.2 | 3580 | 15.4 |

[1]Sulfochem ™ SLS anionic surfactant
[2]Chembetaine ™ CAD amphoteric surfactant
[3]Sulfochem ™ EA-1 ethoxylated anionic surfactant The addition of an amphoteric surfactant to the anionic surfactant chassis containing a polymer prepared by the process of the invention improves yield stress and viscosity values, as well as providing for a less turbid composition.

EXAMPLE 18

The experiment of Example 17 is repeated except that a different amphoteric surfactant (alkyl betaine (AB)), and non-ethoxylated anionic surfactant (ammonium lauryl sulfate (ALS)) are utilized in formulating the surfactant chassis. The results are shown in Table 6.

TABLE 6

| Polymer Ex. 7 (wt. %) | ALS[1] (wt. %) | SLS[2] (wt. %) | AB[3] (wt. %) | CAPB[4] (wt. %) | Yield Stress (Pa) | BV (mPa·s) | Turbidity (NTU) |
|---|---|---|---|---|---|---|---|
| 3 | — | 14 | 3 | — | 11.0 | 5460 | 21.4 |
| 3 | 14 | — | — | 3 | 17.5 | 10780 | 14.1 |

[1]Sulfochem ™ ALS anionic surfactant
[2]Sulfochem ™ SLS anionic surfactant
[3]Chembetaine ™ BW amphoteric surfactant
[4]Chembetaine ™ CAD amphoteric surfactant

EXAMPLE 19

The VA rich homopolymer prepared by the process of Example 1 is formulated in an anionic/amphoteric surfactant chassis and examined for yield stress (at a frequency of 1 Hz), viscosity, turbidity and suspension stability. The results are reported in Table 7.

TABLE 7

| Polymer Ex. 07 (wt. %) | SLS[1] (wt. %) | CAPB[2] (wt. %) | Yield Stress (Pa) | BV (mPa·s) | Turbidity (NTU) | Suspension Stability[3] |
|---|---|---|---|---|---|---|
| 0.5 | 14 | 3 | 0.0 | 260 | 67 | Fail |
| 1.0 | 14 | 3 | 1.3 | 1140 | 58 | Pass |
| 1.5 | 14 | 3 | 9.4 | 4760 | 58 | Pass |
| 2.0 | 14 | 3 | 25.6 | 9800 | 49 | Pass |
| 2.5 | 14 | 3 | 35.2 | 12360 | 36 | Pass |
| 3.0 | 14 | 3 | 34.4 | 14160 | 28 | Pass |

[1]Sulfochem ™ SLS anionic surfactant
[2]Chembetaine ™ CAD amphoteric surfactant
[3]Four week test duration At 1 wt. % and above of active polymer concentration, the surfactant composition exhibits a yield stress and the ability to stably suspend beads.

EXAMPLE 20

The vinyl acetate rich copolymer prepared by the process of Example 7 is formulated in selected anionic/amphoteric surfactant chassis indicated in the tables below in deionized (D.I.) water (q.s. to 100 wt. %). The surfactant compositions are examined for yield stress (at a frequency of 1 Hz), viscosity, turbidity and suspension stability. The results are reported in Tables 8 to 11.

TABLE 8

| Polymer Ex. 7 (wt.%) | SLS[1] (wt.%) | CAPB[2] (wt.%) | Yield Stress (Pa) | BV (mPa·s) | Turbidity (NTU) | Suspension Stability[3] |
|---|---|---|---|---|---|---|
| 0.5 | 14 | 3 | 0.0 | 100 | 59 | Fail |
| 1.0 | 14 | 3 | 0.0 | 540 | 48 | Fail |
| 1.5 | 14 | 3 | 0.9 | 1520 | 48 | Pass |
| 2.0 | 14 | 3 | 5.1 | 3860 | 22 | Pass |
| 2.5 | 14 | 3 | 9.1 | 5540 | 18 | Pass |
| 3.0 | 14 | 3 | 11.0 | 5940 | 15 | Pass |

[1]Sulfochem ™ SLS anionic surfactant
[2]Chembetaine ™ CAD amphoteric surfactant
[3]Four week test duration

TABLE 9

| Polymer Ex. 7 (wt.%) | SLES-1[1] (wt.%) | CAPB[2] (wt.%) | Yield Stress (Pa) | BV (mPa·s) | Turbidity (NTU) | Suspension Stability |
|---|---|---|---|---|---|---|
| 0.5 | 14 | 3 | 0.0 | 80 | 50 | Fail |
| 1.0 | 14 | 3 | 0.0 | 480 | 36 | Fail |
| 1.5 | 14 | 3 | 0.0 | 1620 | 25 | Fail |
| 2.0 | 14 | 3 | 4.4 | 3140 | 23 | Pass |
| 2.5 | 14 | 3 | 7.0 | 4700 | 27 | Pass |
| 3.0 | 14 | 3 | 9.1 | 6240 | 33 | Pass |

[1]Sulfochem ™ EA-1 ethoxylated anionic surfactant
[2]Chembetaine ™ CAD amphoteric surfactant

TABLE 10

| Polymer Ex. 7 (wt.%) | SLS[1] (wt.%) | AB[2] (wt.%) | Yield Stress[3] (Pa) | BV (mPa·s) | Turbidity (NTU) | Suspension Stability[4] |
|---|---|---|---|---|---|---|
| 0.5 | 14 | 3 | 0.0 | 320 | 39 | Fail |
| 1.0 | 14 | 3 | 0.0 | 1020 | 44 | Fail |
| 1.5 | 14 | 3 | 0.0 | 2600 | 33 | Fail |
| 2.0 | 14 | 3 | 5.95 | 5320 | 35 | Pass |
| 2.5 | 14 | 3 | 7.01 | 5800 | 24 | Pass |
| 3.0 | 14 | 3 | 8.47 | 5460 | 21 | Pass |

[1]Sulfochem™ SLS anionic surfactant
[2]Chembetaine™ BW amphoteric surfactant
[3]Frequency 1 rad/sec.
[4]Four week test duration

TABLE 11

| Polymer Ex. 7 (wt.%) | ALS[1] (wt.%) | CAPB[2] (wt.%) | Yield Stress (Pa) | BV (mPa·s) | Turbidity (NTU) | Suspension Stability[3] |
|---|---|---|---|---|---|---|
| 0.5 | 14 | 3 | 0.0 | 4360 | 33 | Fail |
| 1.0 | 14 | 3 | 0.0 | 6580 | 31 | Fail |
| 1.5 | 14 | 3 | 0.0 | 8660 | 18 | Fail |
| 2.5 | 14 | 3 | 10.5 | 13640 | 21 | Pass |
| 3.0 | 14 | 3 | 17.5 | 10780 | 14 | Pass |

[1]Sulfochem™ ALS anionic surfactant
[2]Chembetaine™ CAD amphoteric surfactant
[3]Four week test duration

EXAMPLE 21

The VA homopolymer prepared by the process of Comparative Example 9 is formulated at various concentrations in various surfactant chassis in deionized (D.I.) water (q.s. to 100 wt. %) and examined for turbidity properties. The results are reported in Table 12.

TABLE 12

| Polymer Ex. 9[1] (wt. %) | SLS[2] (wt. %) | CAPB[3] (wt. %) | Turbidity (NTU) |
|---|---|---|---|
| 0.5 | 14 | 3 | 89.3 |
| 1.0 | 14 | 3 | 361 |
| 1.5 | 14 | 3 | 467 |
| 2.0 | 14 | 3 | 861 |
| 2.5 | 14 | 3 | 937 |
| 2.5 | 14 | 3 | 719 |
| 3.0 | 14 | 3 | 367 |
| 3.0 | 14 | 3 | 868 |

[1]Comparative polymer
[2]Sulfochem™ SLS anionic surfactant
[3]Chembetaine™ CAD amphoteric surfactant At low polymer concentrations (0.5 wt. %) the SLS/CAPB surfactant formulation exhibits relatively high turbidity values, and at higher concentrations of polymer the surfactant compositions are extremely turbid.

EXAMPLE 22

The VA homopolymer prepared by the process of Comparative Example 10 is formulated at 2.5 wt. % and 3.0 wt. % concentrations in SLS/CAPB and SLES/CAPB surfactant blends in deionized (D.I.) water (q.s. to 100 wt. %) and examined for yield stress, viscosity, turbidity and suspension stability as in Example 20. The results are reported in Tables 13 and 14.

TABLE 13

| Polymer Ex. 10[1] (wt. %) | SLS[2] (wt.%) | CAPB[3] (wt.%) | Yield Stress (Pa) | BV (mPa·s) | Turbidity (NTU) | Suspension Stability[4] |
|---|---|---|---|---|---|---|
| 2.5 | 14 | 3 | 0.0 | 6000 | 156 | Fail |
| 3.0 | 14 | 3 | 0.0 | 5300 | 73.6 | Fail |

[1]Comparative polymer
[2]Sulfochem™ SLS anionic surfactant
[3]Chembetaine™ CAD amphoteric surfactant
[4]Four week test duration Surfactant blends of SLS/CAPB formulated with the VA copolymer prepared by the process of Comparative Example 10 do not suspend beads and are turbid.

TABLE 14

| Polymer Ex. 10[1] (wt. %) | SLES-1[2] (wt.%) | CAPB[3] (wt. %) | Yeild Stress (Pa) | BV (mPa·s) | Turbidity (NTU) | Suspension Stability[4] |
|---|---|---|---|---|---|---|
| 2.5 | 14 | 3 | 6.9 | 2880 | 1011 | Pass |
| 3.0 | 14 | 3 | 10.6 | 4220 | 374 | Pass |

[1]Comparative polymer
[2]Sulfochem™ EA-1 ethoxylated anionic surfactant
[3]Chembetaine™ CAD amphoteric surfactant
[4]Four week test duration While surfactant blends of SLES-1/CAPB formulated with the VA copolymer prepared by the process of Comparative Example 10 are able to suspend beads, these formulations are very turbid relative to the polymers prepared by the process of the invention.

EXAMPLE 23

The VA homopolymer prepared by the process of Comparative Example 11 is formulated at a 2.5 wt. % concentrations in SLS surfactant in deionized (D.I.) water (q.s. to 100 wt. %) and evaluated for yield stress, viscosity, turbidity and suspension stability as in Example 20. The results are reported in Table 15.

TABLE 15

| Polymer Ex. 11[1] (wt. %) | SLS[2] (wt. %) | Yield Stress (Pa) | BV (mPa·s) | Turbidity (NTU) | Suspension Stability[3] |
|---|---|---|---|---|---|
| 2.5 | 14 | 0 | 80 | 20.3 | Fail |

[1]Comparative polymer
[2]Sulfochem™ SLS anionic surfactant
[3]Four week test duration While the VA homopolymer is prepared by a similar process to the invention (with the exception of the oxidant initiator ammonium persulfate), SLS surfactants formulated with the comparative polymer have no yield stress value and (even at high concentrations) do not suspend beads.

EXAMPLE 24

The VA rich copolymer prepared by the process of Comparative Example 12 is formulated at a 2.5 wt. % concentration in SLS/CAPB and SLES/CAPB surfactant blends in deionized (D.I.) water (q.s. to 100 wt. %). The vinyl acetate copolymer is prepared by a process similar to that of the invention except that the crosslinking monomer MBAM (an acrylamide based crosslinker) is utilized. The surfactant compositions are evaluated for yield stress, viscosity, turbidity and suspension stability as in Example 20. The results are reported in Table 16.

TABLE 16

| Polymer Ex. 12[1] (wt. %) | SLS[2] (wt. %) | SLES-1[3] (wt. %) | CAPB[4] (wt. %) | Yield Stress (Pa) | BV (mPa · s) | Turbidity (NTU) | Suspension Stability[5] |
|---|---|---|---|---|---|---|---|
| 2.5 | 14 | — | 3 | 0 | 760 | 3.1 | Fail |
| 2.5 | — | 14 | 3 | 0 | 660 | 3.1 | Fail |

[1]Comparative polymer
[2]Sulfochem ™ SLS anionic surfactant
[3]Sulfochem ™ EA-1 ethoxylated anionic surfactant
[4]Chembetaine ™ CAD amphoteric surfactant
[5]Four week test duration While the surfactant composition formulated with the polymer prepared by the process of Comparative Example 12 exhibits low turbidity values, the composition has no yield stress and in unable to suspend beads. Example 25.

The VA rich copolymer prepared by the process of Comparative Example 13 is formulated at a 2.5 wt. % as in Example 24. The VA rich copolymer is prepared by a process similar to that of the invention except that the crosslinking monomer TMPTA (an acrylate based crosslinker) is utilized. The surfactant compositions are evaluated for yield stress, viscosity, turbidity and suspension stability as in Example 20. The results are reported in Table 17.

TABLE 17

| Polymer Ex. 13[1] (wt. %) | SLS[2] (wt. %) | SLES-1[3] (wt. %) | CAPB[4] (wt. %) | Yield Stress (Pa) | BV (mPa · s) | Turbidity (NTU) | Suspension Stability[5] |
|---|---|---|---|---|---|---|---|
| 2.5 | 14 | — | 3 | 0 | 1140 | 5.7 | Fail |
| 2.5 | — | 14 | 3 | 0 | 1020 | 8.4 | Fail |

[1]Comparative polymer
[2]Sulfochem ™ SLS anionic surfactant
[3]Sulfochem ™ EA-1 ethoxylated anionic surfactant
[4]Chembetaine ™ CAD amphoteric surfactant
[5]Four week test duration While the polymers prepared by the process of Comparative Examples 12 and 13 (when formulated into anionic/amphoteric surfactant blends) have low turbidity values, they do not provide a yield stress and do not suspend beads.

What is claimed is:

1. A method for increasing the yield stress of an aqueous surfactant containing a composition comprising from about 6 to about 25 wt. % of at least one anionic surfactant said method comprising adding to the surfactant composition from about 2 to about 5 wt. % of a crosslinked, nonionic yield stress polymer prepared by:
   a) providing a monomer composition comprising from about 65 wt.% to about 100 wt.%, based on the wt. of total monomers, of vinyl acetate and at least 0.01 wt.% of a crosslinking monomer, based on dry polymer weight, selected from at least one polyalkenyl polyether having at least two polymerizable ethylenically unsaturated double bonds; and
   b) polymerizing said monomer composition by emulsion polymerization in the presence of a free radical redox initiator pair comprising an oxidant and a reducing agent in a sufficient amount to initiate polymerization, wherein said oxidant is selected from cumene hydroperoxide, a tertiary $C_4$ to $C_6$ alkyl hydroperoxide, and mixtures thereof; and said reducing agent is selected from sodium and ammonium sulfite; sodium and ammonium bisulfite; sodium and ammonium thiosulfate; sodium and ammonium hydrosulfite; sodium and ammonium sulfide; sodium and ammonium hydrosulfide; formamidine sulfinic acid, hydroxymethanesulfonic acid, acetone bisulfite, ethanolamine, glycolic acid and salts thereof, glyoxylic acid hydrate, ascorbic acid and salts thereof, erythorbic acid and salts thereof, lactic acid and salts thereto, glyceric acid and salts thereof, malic acid and salts thereof, 2-hydroxy-2-sulfinatoacetic acid and salts thereof, 2-hydroxy-2-sulfonatoacetic acid and salts thereof, tartaric acid and salts thereof; and combinations thereof.

2. A method according to claim 1, wherein said surfactant containing composition further comprises an amphoteric surfactant, a nonionic surfactant, and mixtures thereof.

3. A method according to claim 1, wherein the at least one anionic surfactant is ethoxylated.

4. A method according to claim 3, wherein the at least one anionic surfactant contains an average of 1 to 3 moles of ethoxylation.

5. A method according to claim 1, wherein the concentration of surfactant ranges from about 6 to about 20 wt. % based on the weight of the total composition.

6. A method according to claim 1, wherein said surfactant containing composition further comprises an amphoteric surfactant and the ratio of anionic surfactant to amphoteric surfactant is about 10:1 to about 2:1.

7. A method according to claim 1, wherein said composition is able to suspend beads of a size between 0.5 and 1.5 mm for at least four weeks at 23° C. wherein the difference in specific gravity between the bead material and water is between 0.01 and 0.05.

8. A method according to claim 1, wherein said composition is able to suspend microcapsules of a size between 0.5 and 300 μm for at least four weeks at 23° C. wherein the difference in specific gravity between the microcapsule beads and water is between 0.2 and 0.5.

9. A method according to claim 1, wherein said yield stress is substantially independent of pH in the pH range 2 to 14.

10. A method according to claim 1, wherein said composition further comprises an insoluble material, a particulate material, or combinations thereof.

11. A method according to claim 10, wherein said particulate material is selected from mica, coated mica, pigments, exfoliants, anti-dandruff agents, clay, swellable clay, laponite, microsponges, cosmetic beads, cosmetic microcapsules, flakes, and mixtures thereof.

12. A method according to claim 10, wherein said particulate material is selected from sand, sintered bauxite, glass balls, ceramic materials, polystyrene beads, and mixtures thereof.

13. A method according to claim 10, wherein said insoluble material is selected from gas bubbles, liposomes, silicones, and mixtures thereof.

14. A process for preparing a vinyl acetate rich yield stress emulsion polymer comprising;
   a) providing a monomer composition comprising from about 65 wt. % to about 100 wt. % based in the wt. of total monomers, of vinyl acetate and at least 0.01 wt. %, based on dry polymer weight, of a crosslinking monomer selected from at least one polyalkenyl polyether having at least two polymerizable ethylenically unsaturated double bonds;
   b) polymerizing said monomer composition under emulsion polymerization conditions in the presence of a free radical redox initiator pair comprising an oxidant and a reducing agent in a sufficient amount to initiate polymerization, wherein said oxidant is selected from cumene hydroperoxide, a tertiary $C_4$ to $C_6$ alkyl hydroperoxide, and mixtures thereof.

15. A process according to claim 14, wherein said oxidant is selected from cumene hydroperoxide, t-butyl hydroperoxide, t-amyl hydroperoxide, and combinations thereof.

16. A process according to claim 14, wherein said reducing agent is selected from sodium and ammonium sulfite; sodium and ammonium bisulfite; sodium and ammonium thiosulfate; sodium and ammonium hydrosulfite; sodium and ammonium sulfide; sodium and ammonium hydrosulfide; formamidine sulfinic acid, hydroxymethanesulfonic acid, acetone bisulfite, ethanolamine, glycolic acid and salts thereof, glyoxylic acid hydrate, ascorbic acid and salts thereof, erythorbic acid and salts thereof, lactic acid and salts thereto, glyceric acid and salts thereof, malic acid and salts thereof, 2-hydroxy-2-sulfinatoacetic acid and salts thereof, 2-hydroxy-2-sulfonatoacetic acid and salts thereof, tartaric acid and salts thereof; and combinations thereof.

17. A process according to claim 15, wherein said reducing agent is selected from erythorbic acid, sodium salt of 2-hydroxy-2-sufinatoacetic acid, sodium salt of 2-hydroxy-2-sufonatoacetic acid, sodium sulfite, and combinations thereof.

18. A process according to claim 14, wherein said at least one crosslinking monomer is selected from polyallyl ethers of trimethylolpropane, polyallyl ethers of pentaerythritol, polyallyl ethers of sucrose, and mixtures thereof.

19. A process according to claim 18, wherein said at least one crosslinking monomer is selected from pentaerythritol diallyl ether, pentaerythritol triallyl ether, pentaerythritol tetraallyl ether, and mixtures thereof.

20. A process according to claim 14, wherein said monomer mixture further comprises from about 1 to about 35 wt. % of a free radically polymerizable monomer selected from:
   i) at least one $C_1$-$C_{22}$ alkyl (meth)acrylate;
   ii) at least one N-vinyl amide;
   iii) at least one vinyl ester, excluding vinyl acetate, of an aliphatic carboxylic acid containing an acyl moiety having 2 to 22 carbon atoms;
   iv) at least one hydroxy($C_1$-$C_5$)alkyl (meth)acrylate;
   vi) at least one associative monomer;
   vii) at least one semi-hydrophobic monomer; and
   viii) mixtures of monomers i), ii), iii), iv), v), vi), and vii).

21. A process according to claim 20, wherein said at least one $C_1$-$C_{22}$ alkyl (meth)acrylate is selected from methyl (meth)acrylate, ethyl (meth)acrylate butyl (meth)acrylate, sec-butyl (meth)acrylate, iso-butyl (meth)acrylate, hexyl (meth)acrylate), heptyl (meth)acrylate, octyl (meth) acrylate, 2-ethylhexyl (meth)acrylate, decyl (meth)acrylate, isodecyl (meth)acrylate, lauryl (meth)acrylate, tetradecyl (meth)acrylate, hexadecyl (meth)acrylate, stearyl (meth) acrylate, behenyl (meth)acrylate, and mixtures thereof.

22. A process according to claim 20, wherein said N-vinyl amide is selected from vinyl amide is selected from N-vinylformamide, N-methyl-N-vinylformamide, N-(hydroxymethyl)-N-vinylformamide, N-vinylacetamide, N-vinylmethylacetamide, N-(hydroxymethyl)-N-vinylacetamide, and mixtures thereof; and said N-vinyl lactam is selected from N-vinyl-2-pyrrolidinone, N-(1-methyl vinyl) pyrrolidinone, N-vinyl-2-piperidone, N-vinyl-2-caprolactam, N-vinyl-5-methyl pyrrolidinone, N-vinyl-3,3-dimethyl pyrrolidinone, N-vinyl-5-ethyl pyrrolidinone and N-vinyl-6-methyl piperidone, and mixtures thereof.

23. A process according to claim 20, wherein said at least one vinyl ester, excluding vinyl acetate, of an aliphatic carboxylic acid containing an acyl moiety having 2 to 22 carbon atoms is selected from vinyl propionate, vinyl butyrate, vinyl isobutyrate, vinyl valerate, vinyl hexanoate, vinyl 2-methylhexanate, vinyl 2-ethylhexanoate, vinyl iso-octanoate, vinyl nonanoate, vinyl neodecanoate, vinyl decanoate, vinyl versatate, vinyl laurate, vinyl palmitate, vinyl stearate, and mixtures thereof.

24. A process of according to claim 20, wherein said $C_1$-$C_5$ hydroxyalkyl (meth)acrylate monomer is selected from 2-hydroxyethyl(meth)acrylate, 3-hydroxypropyl (meth)acrylate, 4-hydroxybutyl(meth)acrylate, and mixtures thereof.

25. A process of according to claim 20, wherein said at least one associative monomer comprises (i) a polymerizable ethylenically unsaturated end group portion, (ii) a polyoxyalkylene mid-section portion, and (iii) a hydrophobic end group portion containing 7 to 30 carbon atoms.

26. A process of according to claim 25, wherein said at least one associative monomer is represented by formulas VII and/or VIIA:

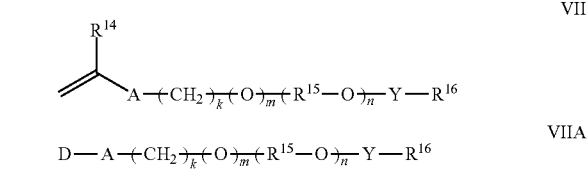

wherein $R^{14}$ is hydrogen or methyl; A is —$CH_2C(O)O$—, —$C(O)O$—, —$O$—, —$CH_2O$—, —$NHC(O)NH$—, —$C(O)NH$—, —$Ar$—$(CE_2)_z$-$NHC(O)O$—, —$Ar$—$(CE_2)_z$-$NHC(O)NH$—, or —$CH_2CH_2NHC(O)$—; a divalent alkylene radical containing 1 to 5 carbon atoms; Ar is a divalent arylene (e.g., phenylene); E is H or methyl; z is 0 or 1; k is an integer ranging from about 0 to about 30, and m is 0 or 1, with the proviso that when k is 0, m is 0, and when k is in the range of 1 to about 30, m is 1; D represents a vinyl or an allyl moiety; $(R^{15}—O)_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150; Y is —$R^{15}O$—, —$R^{15}NH$—, —$C(O)$—, —$C(O)NH$—, —$R^{15}NHC(O)NH$—, or —$C(O)NHC(O)$—; $R^{16}$ is a substituted or unsubstituted alkyl selected from a $C_8$-$C_{30}$ linear alkyl, a $C_8$-$C_{30}$ branched alkyl, a $C_7$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl; wherein the $R^{16}$ alkyl group, carbocyclic alkyl group, aryl group, phenyl group optionally comprises one or more substituents selected from the group selected from a methyl group, hydroxyl group, an alkoxyl group, benzyl group styryl group, and a halogen group.

27. A process of according to claim 26, wherein said at least one associative monomer is represented by formula VIIB:

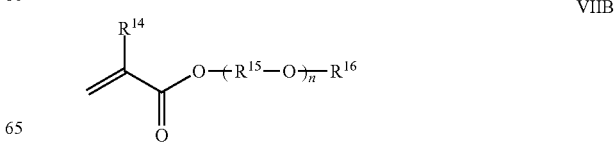

wherein $R^{14}$ is hydrogen or methyl; $R^{15}$ is a divalent alkylene moiety independently selected from $C_2H_4$, $C_3H_6$, and $C_4H_8$, and n represents an integer ranging from about 10 to about 60, ($R^{15}$—O) can be arranged in a random or a block configuration; $R^{16}$ is a substituted or unsubstituted alkyl selected from a $C_8$-$C_{30}$ linear alkyl, a $C_8$-$C_{30}$ branched alkyl, a $C_7$-$C_{30}$ carbocyclic alkyl, a $C_2$-$C_{30}$ alkyl-substituted phenyl, an araalkyl substituted phenyl, and an aryl-substituted $C_2$-$C_{30}$ alkyl, wherein the $R^{16}$ alkyl group, aryl group, phenyl group optionally comprises one or more substituents selected from the group consisting of a hydroxyl group, an alkoxyl group, benzyl group, styryl group, and a halogen group.

28. A process of according to claim 20, wherein said at least one semi-hydrophobic monomer comprises (i) a polymerizable ethylenically unsaturated end group portion, (ii) a polyoxyalkylene mid-section portion, and (iii) an end group portion selected from hydrogen or an alkyl group containing 1 to 4 carbon atoms.

29. A process of according to claim 18, wherein said at least one semi-hydrophobic monomer is selected from at least one monomer represented by formulas VIII and IX:

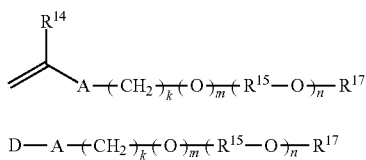

VIII

IX wherein $R^{14}$ is hydrogen or methyl; A is —$CH_2C(O)O$—, —$C(O)O$—, —O—, —$CH_2O$—, —$NHC(O)NH$—, —$C(O)NH$—, —Ar—$(CE_2)_z$-$NHC(O)O$—, —Ar—$(CE_2)_z$-$NHC(O)NH$—, or —$CH_2CH_2NHC(O)$—; Ar is a divalent arylene; E is H or methyl; z is 0 or 1; k is an integer ranging from about 0 to about 30, and m is 0 or 1, with the proviso that when k is 0, m is 0, and when k is in the range of 1 to about 30, m is 1; ($R^{15}$—O)$_n$ is a polyoxyalkylene moiety, which can be a homopolymer, a random copolymer, or a block copolymer of $C_2$-$C_4$ oxyalkylene units, $R^{15}$ is a divalent alkylene moiety selected from $C_2H_4$, $C_3H_6$, or $C_4H_8$, and combinations thereof; and n is an integer in the range of about 2 to about 150; $R^{17}$ is selected from hydrogen and a linear or branched $C_1$-$C_4$ alkyl group; and D represents a vinyl or an allyl moiety.

30. A process of according to claim 29, wherein said at least one semi-hydrophobic monomer is selected from at least one monomer represented by formulas VIIIA and VIIIB:

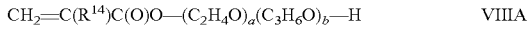

VIIIA

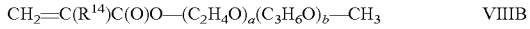

VIIIB wherein $R^{14}$ is hydrogen or methyl, and "a" is an integer ranging from 0 or 2 to about 120, and "b" is an integer ranging from about 0 or 2 to about, subject to the proviso that "a" and "b" cannot be 0 at the same time.

31. A process of according to claim 25, wherein said at least one associative monomer is selected from lauryl polyethoxylated (meth)acrylate (LEM), cetyl polyethoxylated (meth)acrylate (CEM), cetearyl polyethoxylated (meth)acrylate (CSEM), stearyl polyethoxylated (meth)acrylate, arachidyl polyethoxylated (meth)acrylate, behenyl polyethoxylated (meth)acrylate (BEM), cerotyl polyethoxylated (meth)acrylate, montanyl polyethoxylated (meth)acrylate, melissyl polyethoxylated (meth)acrylate, phenyl polyethoxylated (meth)acrylate, nonylphenyl polyethoxylated (meth)acrylate, ω-tristyrylphenyl polyoxyethylene (meth)acrylate, where the polyethoxylated portion of the monomer contains from about 2 to about 150 ethylene oxide units; octyloxy polyethyleneglycol polypropyleneglycol (meth)acrylate, phenoxy polyethylene glycol polypropylene glycol (meth)acrylate, and nonylphenoxy polyethylene glycol polypropylene glycol (meth)acrylate, where the polyethoxylated and/or the polypropoxylated portion of the monomer independently contain 0 or 2 to about 120; and mixtures thereof.

32. A process of according to claim 30, wherein said at least one semi-hydrophobic monomer is selected from polyethyleneglycol (meth)acrylate, polypropyleneglycol (meth)acrylate, polyethyleneglycol polypropylene glycol methacrylate or methoxypolyethyleneglycol (meth)acrylate, where the polyethoxylated and/or the polypropoxylated porton of the monomer independently contain 0 or 2 to about 120; and mixtures thereof.

33. A process of according to claim 30, wherein said at least one semi-hydrophobic monomer is selected from a compound having the formula: $CH_2$=$CH$—$O(CH_2)_4O(C_3H_6O)_4(C_2H_4O)_{10}H$; $CH_2$=$CH$—$O(CH_2)_4O(C_3H_6O)_4(C_2H_4O)_{20}H$; $CH_2$=$CH$—$O(CH_2)_4O(C_3H_6O)_4(C_2H_4O)_{30}H$; $CH_2$=$CHCH_2O(C_3H_6O)_4(C_2H_4O)_{10}H$; $CH_2$=$CHCH_2O(C_3H_6O)_4(C_2H_4O)_{20}H$; $CH_2$=$CHCH_2O(C_3H_6O)_4(C_2H_4O)_{30}H$; and $CH_2$=$CHCH_2O(C_3H_6O)_5(C_2H_4O)_5H$.

34. A process according to claim 20, wherein said monomer composition comprises:
 a) from about 70 to about 100 wt. % vinyl acetate;
 b) from about 0 to about 30 wt. % (based on the wt. of total monomers) of at least one $C_1$-$C_{22}$ alkyl (meth)acrylate;
 c) from about 0 to about 25 wt. % of at least one N-vinyl lactam;
 d) from about 0 to about 25 wt. % in one aspect of at least one vinyl ester, excluding vinyl acetate, of an aliphatic carboxylic acid containing an acyl moiety having 2 to 22 carbon atoms, wherein all weight percentages of monomers a) through d) are based on the weight of total monomers; and
 e) from about 0 to about 1 wt. %, based on the total dry wt. of the polymer, of at least one crosslinking monomer is selected from polyallyl ethers of trimethylolpropane, polyallyl ethers of pentaerythritol, polyallyl ethers of sucrose, and mixtures thereof.

35. A process according to claim 34, wherein said at least one crosslinking monomer is selected from pentaerythritol diallyl ether, pentaerythritol triallyl ether, pentaerythritol tetraallyl ether, and mixtures thereof.

* * * * *